United States Patent [19]

Deziel, Jr. et al.

[11] Patent Number: 5,406,476
[45] Date of Patent: Apr. 11, 1995

[54] METHOD AND APPARATUS FOR RESOURCE CONSTRAINT SCHEDULING

[75] Inventors: Louis B. Deziel, Jr., Mountain View; Liane Finstad, Los Gatos, both of Calif.

[73] Assignee: Sun Microsystems, Inc., Mountain View, Calif.

[21] Appl. No.: 126,101

[22] Filed: Sep. 23, 1993

Related U.S. Application Data

[63] Continuation of Ser. No. 684,036, Apr. 11, 1991, abandoned.

[51] Int. Cl.⁶ .................. G06F 15/22; G06F 15/24; G06F 15/20; G06F 15/46; G06G 7/48; G06G 7/52; G06G 7/64; G06G 7/66
[52] U.S. Cl. .................................... 364/402; 364/401; 364/468
[58] Field of Search .................. 364/401, 402

[56] References Cited

U.S. PATENT DOCUMENTS

| | | | |
|---|---|---|---|
| 4,644,479 | 2/1987 | Kemper et al. | 364/550 |
| 4,648,023 | 3/1987 | Powell | 364/156 |
| 5,016,170 | 5/1991 | Pollalis et al. | 364/401 |
| 5,040,116 | 8/1991 | Evans, Jr. et al. | 364/424.02 |

OTHER PUBLICATIONS

"A Survey of Scheduling Rules," Panwalker et al. Operations Research, vol. 25, No. 1, Jan.–Feb. 1977, pp. 45–60

Time Line in "Maser Plans: Project Management Software," Fersko-Weiss, PC Magazine, vol. 16, Issue N16 (Dialog Acc. No. 05245494).

Fersko-Weiss; "Super Project Expert"; PC Magazine; vol. 9 No. 15; p. 358(2); Sep. 11, 1990; Dialog: File 648, Acc#08790584.

Primary Examiner—Gail O. Hayes
Assistant Examiner—Stephen R. Tkacs
Attorney, Agent, or Firm—Blakely Sokoloff Taylor & Zafman

[57] ABSTRACT

Constrained resource allocation techniques are implemented with a digital computer due to its improved speed and graphics capability. These techniques allow for rapid resource constrained scheduling when given a precedence ordered list of activities. Resources are allocated to activities in order of highest priority with all precedence constraints being taken into account. Resources are allocated in such a manner that preserves the integrity of the random variables associated with start and finish times of activities. Activity durations and start/finish expected values and variances are adjusted to account for shortfalls occurring prior to an activity's start time and between an activity's start and finish times. The result is a schedule of start and finish times for each activity that is resource feasible and achievable within a prescribed confidence level.

24 Claims, 15 Drawing Sheets

METHOD AND APPARATUS FOR RESOURCE CONSTRAINT SCHEDULING

This is a continuation of application Ser. No. 07/684,036, filed Apr. 11, 1991, now abandoned.

BACKGROUND OF THE INVENTION

FIELD OF THE INVENTION

The present invention relates to methods for scheduling activities and resources during project management. More particularly, this invention describes an efficient method for scheduling resources amongst a number of activities taking both resource and precedence constraints into consideration while preserving the probabilistic information about the start and finish times of the project's activities.

BACKGROUND ART

Because research and development projects can be exceedingly complex to manage, a number of project management methods have been developed. Planning a project requires a number of variables to be taken into account: the resources that will be required, the people who will be involved, specifying discrete activities in some logical precedence, order, etc. Resources, activities, and personnel will all be constrained in some fashion. Some resources may only be usable for one activity at a time; personnel may be divided between a number of different projects; shortfalls such as illness and vacations must be taken into account. Activities may not be scheduled in a random fashion; in any project some activities will have to precede others in some logical order to successfully complete the project. For example, in constructing a building it would make no sense to install air conditioners prior to laying the foundation or drawing blueprints.

Many methods for project management are well known. The most common, CPM (critical path method), is a deterministic method in which each activity in the project network has a predetermined finite duration. This method has been applied in a number of settings using a number of different facilities. Recently with the progress in the field of digital computers, software products for project management have become available in a myriad of different packages. For a recent discussion of these packages see L. Wood, "The Promise of Project Management", BYTE, November 1988, pp. 180-192.

CPM scheduling requires a determination of what activities are on the critical path and evaluating their start and finish times. Because uncertainties abound in complex projects, the deterministic CPM schedule may have little resemblance to the realities of the project schedule, thereby requiring frequent updating and wasting of a management resource for scheduling purposes.

A more realistic model of a project can be obtained by taking into account the uncertain, or probabilistic, nature of activity durations. Uncertainties arise in a number of ways. An activity may require more total effort than the amount allocated. If it does, then successor activities will be delayed, ad infinitum. Another well known method for project management, PERT (program evaluation and review technique) attempts to take into account the uncertain nature of activity durations. However, the PERT method makes assumptions which provide inadequate models of how to calculate probabilistic information. For example, it is assumed in PERT that the expected cumulative duration to the start of an activity is equal to the maximum of the expected cumulative durations of the inbound activities. This assumption can easily be shown to be inconsistent with the rules of Probability Theory. In Clark, C. E., "The Greatest of a Finite Set of Random Variables", *Operations Research*, March-April 1961, pp. 145-162, Clark sets forth a method which can be applied to determine start times of activities which preserves their probabilistic nature and overcomes the problems which arise in the PERT method.

However, none of the above techniques take into account the limited availability of resources (referred to in the art as "resource constraints"). All or part of a resource may be used by many activities. If activities which require the same resource are scheduled at the same time by a project management tool looking only at precedence information, then the schedule set forth by the project management tool can not be followed. Thus, a method is needed for scheduling both activities and resources which takes into account and preserves the probabilistic information of the activity durations as well as the availability of resources.

The issue of resource constraints has been addressed by developers of large computer software packages which determine a single point estimate for activities. The software operates on a large computer system and is costly and time consuming to execute. Furthermore, such systems are deterministic in nature and do not take into account the uncertain nature of activity durations. (For background information, see Joseph J. Moder, Cecil R. Philips, Edward W. Davis, *Project Management with CPM, Pert and Precedence Diagramming*, pp. 189-217 (Van Nostrand Reinhold Co., 1983).

As will be disclosed below, the present invention provides a rapid method of deriving a resource constrained schedule for a project network that preserves probabilistic information about activity schedules. The present invention provides a means for representing the availability of each resource as an ambient level of availability and a schedule of temporary shortfalls.

SUMMARY OF THE INVENTION

The present invention is a method for quickly scheduling activities while preserving the probabilistic information about activity scheduling and taking resource constraints into consideration. An initial, deterministic, unconstrained schedule is first computed to allow an approximation to be made of each activity's slack time. (Slack time is the amount of time an activity can be delayed without impacting the project's finish date.) The rule for establishing the order in which activities are scheduled is made such that the activity with least available slack time should be scheduled before those with greater slack time.

The minimum-slack selection rule specifies the next activity to be scheduled at each step in an iterative procedure, which continues until all activities are scheduled. In addition to precedence arcs initially defined in the project which identify the activity or activities which must be scheduled before certain activities in the network, the present invention provides for resource arcs in order to take into account resource constraints, thereby providing a more realistic schedule. Resource arcs function as precedence arcs and are added between a scheduled activity and an activity yet to be scheduled when a resource required by the activity to be scheduled is not available until the scheduled activity has completed use of the resource. Furthermore, the present invention accounts for resource shortfalls which occur during the project by adjusting the projected start and finish times of each activity to include delays which will occur due to a resource shortfall.

BRIEF DESCRIPTION OF THE DRAWINGS

FIGS. 3a, 3b, 3c, and 3d illustrate the iterative list processing technique employed in the present invention.

NOTATION AND NOMENCLATURE

Figure 1:
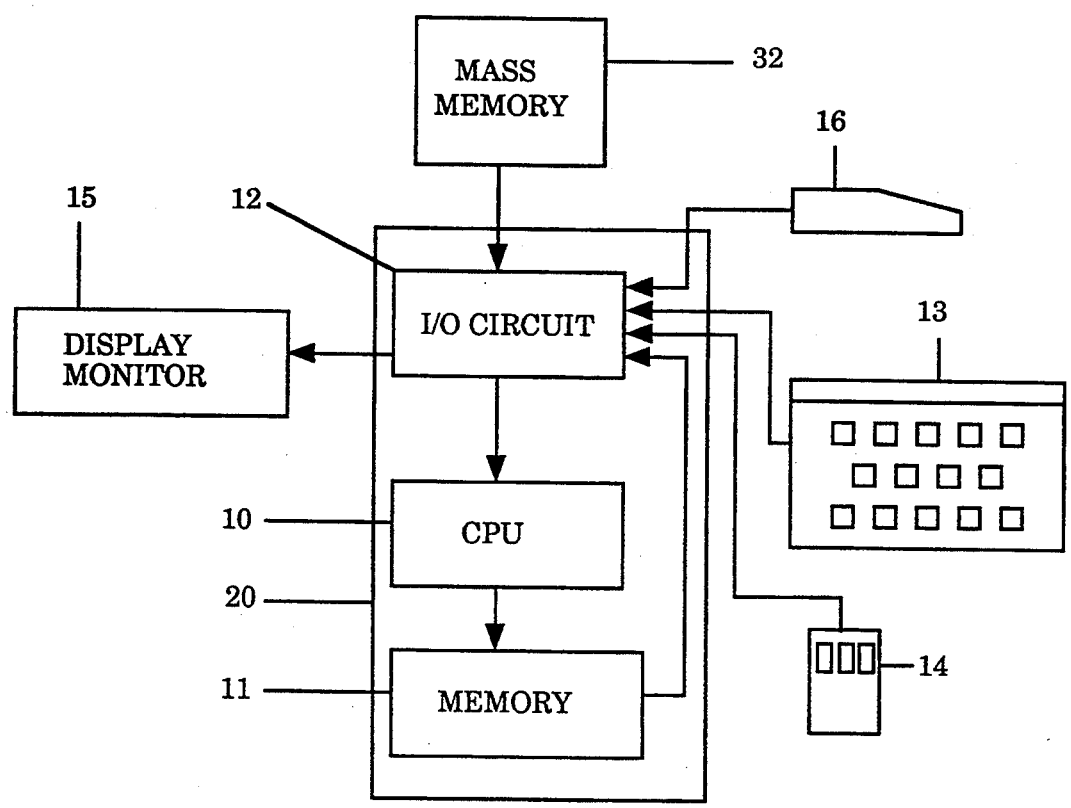
FIG. 1 is a computer incorporating the present invention.

The detailed description that follows is presented largely in terms of algorithms and symbolic representations of operations on data bits and data structures within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulation of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bit patterns, values, elements, symbols, characters, data packages, or the like. It should be borne in mind, however, that all of these and similar terms are to be associated with the appropriate physical quantities and are merely convenient labels applied to these quantities.

Further, the manipulations performed are often referred to in terms, such as adding or comparing, that are commonly associated with mental operations performed by a human operator. No such capability of a human operator is necessary, or desirable in most cases, in any of the operations described herein that form part of the present invention; the operations are machine operations. Useful machines for performing the operations of the present invention include general purpose digital computers or other similar devices. In all cases there should be borne in mind the distinction between the method of operations in operating a computer and the method of computation itself. The present invention relates to method steps for operating a computer in processing electrical or other (e.g. mechanical, chemical) physical signals to generate other desired physical signals.

The present invention also relates to an apparatus for performing these operations. This apparatus may be specially constructed for the required purposes, or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct a more specialized apparatus to perform the required method steps. The required structure for a variety of these machines will appear from the description given below.

TERMS AND DEFINITIONS

Arc: indicator of precedence between activities; depicted as a directed line connecting two activities. The activity at the arc's origin (sometimes referred to as the "tail" activity) must be completed before the activity at the arc's end (referred to as the "head" activity) may be started.

Technical or Logical Arcs: the arcs which define the precedence ordering of the activities in a project network.

Resource Arc: an arc added by the scheduler to add a precedence relationship between two activities which use the same resource. (e.g., Task A and Task B can be done concurrently. However, they both require the same resource. The scheduler adds a "resource arc" between Task A and Task B, forcing one to complete before the other can be started.) A project is referred to as resource constrained when these arcs have been added.

Confidence Level: the percent probability used to schedule activity start and finish times (e.g., a user may specify that she wants a project schedule showing start and finish times with an 85% chance of being met. 85% is the confidence level.)

Inbound or Incoming or Parent Activities: the activities which immediately precede the current activity; that is, activities which must be completed before the current activity can start (activities which are in a "tail" precedence relation to the which are in a "tail" precedence relation to the current activity).

Outbound or Outgoing or Child Activities: the immediately succeeding activities which may not be started until the current activity is completed (activities which are in "head" precedence relation to the current activity).

FTE Available: the full time equivalent level of effort defined for a resource. The FTE available for "Joe," a full-time worker, would be defined as 1. Anne, who works ¾ time would have an FTE available of 0.75. If there are three software engineers who are full-time workers, the FTE available for the resource "Software Engineer" would be 3.

Shortfall: a temporary period of time when a resource is not fully available.—holidays, vacations, weekends, etc.

SF=time point marking the beginning of a shortfall

V=shortfall duration r=(FTE Available—Total Outage)/FTE Available; the fraction of "FTE Available" available during the shortfall.

R=(1/r)—1; delay multiplier. Equals 0 when r=1; approaches infinity as r approaches 0.

u(x,y)=unit step function; 0 if x<y; 1 if x≧y.

Total Outage: the amount by which the FTE Available is reduced during a shortfall.

Shortfall Calendar: a list of a resource's shortfalls, each specified as a temporary level of FTE Available over a fixed time period.

j Index on activities which have been ordered by precedence ij, kj Indices on inbound arcs at activity j $A_{ij}$, $A_{kj}$ Tail (left) activity of arc ij or kj $t_j$ The duration of activity j; a random variable $t_j^\mu$ The expected duration of activity j $t_j^\mu$ =(optimistic+most likely+pessimistic)/3 $t_j^v$=The variance of activity j duration $t_j^v$=[pessimistic-optimistic)$^2$ +(most likely-optimistic)×(most likely-pessimistic)]/18

$T_j$ The cumulative duration through the end of activity j; a random variable $$T_j = M_j + t_J$$

$T_j^\mu$ The expected cumulative duration through the end of activity j $$T_j^\mu = M_j^\mu + t_j^\mu$$

$T_j^v$ The variance of cumulative duration through the end of activity j $$T_j^v = M_j^v + t_j^v$$

$M_j$ The cumulative duration to activity j (start time); a random variable $M_j$=max $\{T_{A1j}, \ldots T_{AIj}\}$ $M_j^\mu$ The expected cumulative duration to activity j $M_j^v$ The cumulative variance to activity j $m_{kj}$ Defined as: $m_{kj}$=max $\{T_{Akj}, m_{(k-1)j}\}$; $m_{1j}=T_{A1j}$; 2≦k≦I ·.$m_{kj}$=max $\{T_{Alk}, \ldots, T_{Akj}\}$ and $M_j=m_{ij}$ $m_{kj}^\mu$ the $k^{th}$ estimate of $M_j^\mu$ $m_{kj}^v$ the $k^{th}$ estimate of $M_j^v$ $b_j$ Tail activity index of the best path arc back from activity j $B_j$ Set of activities numbers of the best path back from activity j $$B_j = \{j\} \cup B_{bj}; B_1 = \{\emptyset\}$$

$J_{ikj}$ Junction activity index of best paths back from $A_{ij}$ and $A_{kj}$; k≠i $$J_{ikj} = max \{B_{Aij} \cap B_{Akj}\}$$

C($T_{Aij}$, $T_{A(i+1)j}$) Correlation between cumulative durations approximated by $$C(T_{best\ path\ ij}, T_{best\ path(i+1)j})$$

C($M_j$, $T_{Aij}$) Correlation between cumulative duration at activity j and the cumulative duration through activity $A_{ij}$ $N^{-1}(\%|\mu,v)$ The inverse cumulative normal distribution for a given mean $\mu$, variance $v$, valued at probability %.

%$F_i$ finish time point for predecessor activity i at % confidence level.

$$F_i = N^{-1}(\%|T_i^\mu, T_i^v)$$

$SF_i$ beginning of shortfall interval after %$F_i$ (finish time for predecessor activity i).

%S' start time point for current activity at % confidence level assuming no short falls occur after %$F_i$.

$$S' = N^{-1}(\%|^F M^\mu, ^F M^v)$$

%S start time point for current activity at confidence level.

$$\%S = N^{-1}(\%|M^\mu, M^v)$$

d^ the shift in %S (start time) caused by shortfalls.

$$d^\wedge = \%S - \%S'$$

%F' finish time for current activity at % confidence level assuming no short falls exist after %S.

$$\%F' = N^{-1}(\%|^F T^\mu, ^F T^v)$$

%F finish time for current activity at % confidence level.

$$\%F = N^{-1}(\%|T^\mu, T^v)$$

e^ the shift in %F (finish time) caused by shortfalls.

$$e^\wedge = \%F - \%F'$$

RANDOM VARIABLES $^F$M start time for the activity assuming no short falls after %$F_i$ for all inbound activities.

d delay in M (start time for an activity) caused by all shortfalls after %$F_1$ (finish time for predecessor activity i).

M start time for an activity.

$$M = {}^F M + d$$

t duration of an activity assuming no shortfalls are encountered.

$^f$T finish time point for an activity assuming no short falls after start time %S.

$$^F T = M + t$$

e delay in the current activity's duration caused by short falls after %S.

T finish time for the activity.

$$T = {}^F T + e$$

DETAILED DESCRIPTION OF THE INVENTION

The present invention will be described as a method corresponding to the diagrams presented in the figures. However, one who is skilled in the art will recognize that the invention may be applied in a variety of fashions.

Although the overall method of the present invention may be carried out by many different facilities, in the preferred embodiment a digital computer such as the one shown in FIG. 1 is used. The digital computer of FIG. 1 comprises a CPU 10, memory 11, and an I/O circuit 12. The CPU 10 performs computational functions and memory addressing. The memory 11 is used for storing programs and data. The I/O circuit 12 provides the computer means for receiving data from a user (not shown), such as by a keyboard 13 or a pointing device 14. The I/O circuit also provides means for outputting results to devices like display monitor 15 or printer 16. It is to be emphasized that using a digital computer is not necessary for applying the present invention, but merely provides a convenience.

In the method of the present invention the project network is first established and initialized. Specifically, the activities of the project network are identified, scheduling precedence (i.e., precedence arcs) is specified between activities indicating the inbound activities to each activity in the project network, and the resources required by each activity and the probabilistic duration of each activity is specified. A confidence level (%) is also specified, identifying a level of confidence that the project network will be performed within the derived schedule. The activities are then scheduled taking into account precedence as well as resource constraints. Resource arcs, which function as precedence arcs, are added when it is determined that there is a probability that the resources required by the activity to be scheduled exceed their general level of availability. Using precedence arcs and resource arcs for the current activity to be scheduled, start and finish times are determined such that the probability of not exceeding these times equals the prespecified (%) confidence level. The probabilistic nature of the activity's duration and the confidence level of the network are preserved. The start and finish times are then further delayed, if necessary, to take into account temporary unavailability of a resource during a project, referred to as resource shortfall. The result is a realistic project schedule which accounts for all network precedence, resource constraints, and probabilistic information on activity duration within the given (%) confidence level.

Figure 2:
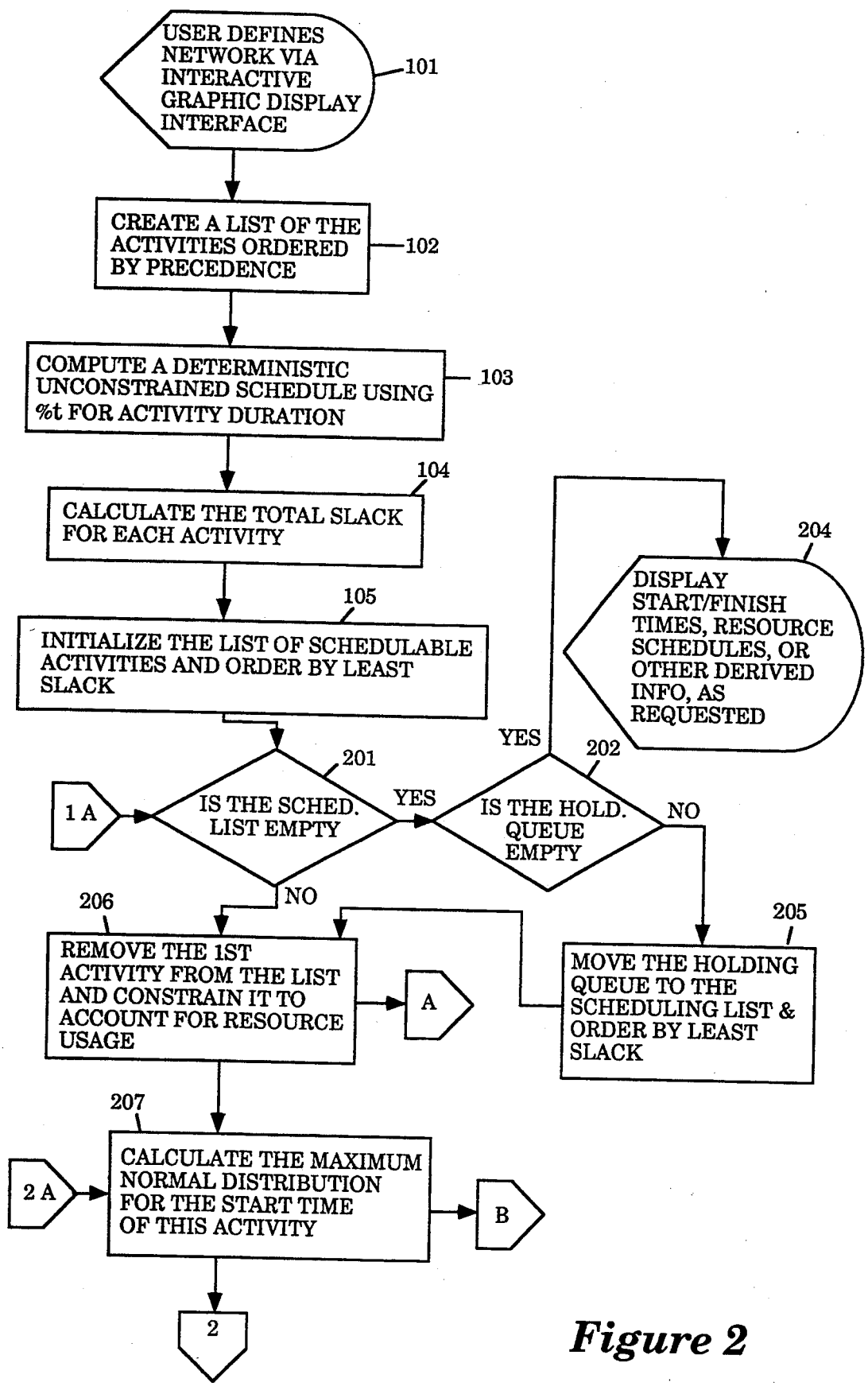
FIG. 2 is the first portion of a general flowchart of the scheduling system in accordance with the present invention.

Referring to FIG. 2, the flowchart discloses several initial steps 101, 102, 103, 104, 105 which are performed prior to executing the iterative procedure which starts at box 201. The initial procedures comprise the following steps:

(1) In box 101, the user or manager defines the project network. This is done by identifying all of the activities that a project will entail as well as the necessary order (precedence) for carrying out the activities. The precedence is specified according to precedence arcs which identify for each activity those activities (if any) which must be scheduled and completed before the current activity can be scheduled. The user will also specify the parameters of a probability distribution on activity duration for each activity. Any parametric form of probability distribution may be used. Without limiting the claim, the method will be illustrated using the Triangular Distribution. The Triangular Distribution requires estimates of the optimistic, pessimistic and most likely durations for each activity. The user also defines the resources required for carrying out each activity. A confidence level used to predict finish times for the activities and project is also specified by the user. Resource availability is specified as a general level of availability (FTE Available) together with a shortfall calendar for each resource. The shortfall calendar identifies when each resource is temporarily below its general level and by how much. Shortfalls represent, for example, a personnel resource on vacation or a device resource shutdown for maintenance. If the user is using a digital computer 20 (FIG. 1), this information may be defined using a graphical display interface comprising keyboard 13, pointing device 14 and display monitor 15 whereby the user enters the information into the computer.

(2) In box 102 (FIG. 2), a list of all activities is created and ordered by precedence. When ordered by precedence, the activities defined to precede other activities are listed before those activities.

(3) In box 103, an initial estimate of the project's duration is calculated using $N^{-1}\,(\%\,|\,t_j^\mu,\,t_j^\nu)$ for each activity's duration.

(4) In box 104, the total slack time for each activity is determined from a deterministic (CPM) schedule of the project. Slack time is the amount of time that may be lost to activity delay without having a delaying effect upon the whole project. For example, activities on the critical path have zero slack time because any delay would extend the entire project.

The resource constrained scheduling procedure of the present invention utilizes an iterative list processing approach to schedule the activities of the project. Activities are selected and scheduled one at a time from a list of schedulable activities. Exactly one activity is scheduled at each step. The priority rule for scheduling an activity is to select from the currently schedulable activities, the one which has the least total slack time from the deterministic schedule as defined above. However, it will be obvious to one skilled in the art that other priority scheduling rules may also be utilized.

Each activity passes through four states as it progresses through the scheduling procedure. The path is summarized as follows:

UNSCHEDULABLE→SCHEDULABLE→
SCHEDULED AND ONGOING→SCHEDULED AND DONE

At any given point in the process, all activities are in one of the four states. Technical precedence and the activities already "Scheduled" determine the "Unschedulable" and "Schedulable" activities. Activities with no unscheduled predecessor activities are moved from the Unscheduled list to the Schedulable list. Then the activity with the least total slack is removed from the Schedulable list and scheduled.

Scheduling an activity entails determining both its start and finish times. The procedure begins by adding any required resource precedence arcs. Then the procedure (illustrated by the flowchart of FIG. 7) determines the start time assuming no shortfalls. The finish time is logically defined as the start time plus the duration of the activity. Either or both start time and finish time may be modified according to the rules for handling resource shortfalls which will be described below. Finally, the Schedulable list is updated by adding any activities which have just become schedulable as a result of scheduling the current activity, that is, those activities which now have no unscheduled predecessor activities. The current activity is considered scheduled at this point. However, it is placed in a "scheduled and ongoing" list. This list tracks the resource commitment information needed to apply the rules for adding resource precedence arcs to the network. Eventually, the activity will be dropped from the list and be considered "Scheduled and Done". The process moves to the next activity to be scheduled, continuing until the unscheduled and schedulable lists are empty and all activities are scheduled.

However, choosing which activity to schedule next only on the basis of least slack may result in a less than optimal selection under certain conditions. In the preferred embodiment a holding queue is utilized to prevent a low priority activity from being scheduled before a high priority activity which utilizes the same resource. Consider a project which consists of three activities, Task A, Task B, and Task C, each of which has a duration of five days. Task C cannot start until Task B is completed. Task B and Task C have zero slack (they are the critical path); Task A has five days slack. Also assume that Person X is assigned full time to Task A and Task C, and Person Y is assigned full time to Task B. Following the scheduling algorithm, Task A and Task B are put on the Schedulable list because they have no predecessor activities. Person Y's task (Task B) is scheduled first because it has zero slack. That releases Task C (Person X's) to the Schedulable list. Since Task C has zero slack, it is chosen to be scheduled next. Finally, Person X's other task, A, is scheduled after Task C. We now have a project which lasts fifteen days, instead of the optimal ten, with Person X sitting idle for the first five days. To avoid this situation, released activities are not put on the Schedulable list immediately. Instead, they are placed in a holding queue until the Schedulable list is empty. One further refinement involves returning an activity to the holding queue unscheduled if one of its resources has been scheduled since the Schedulable list was last filled. This action will prevent a low priority activity from being scheduled before a high priority activity when they both use the same resource.

Figure 3A:
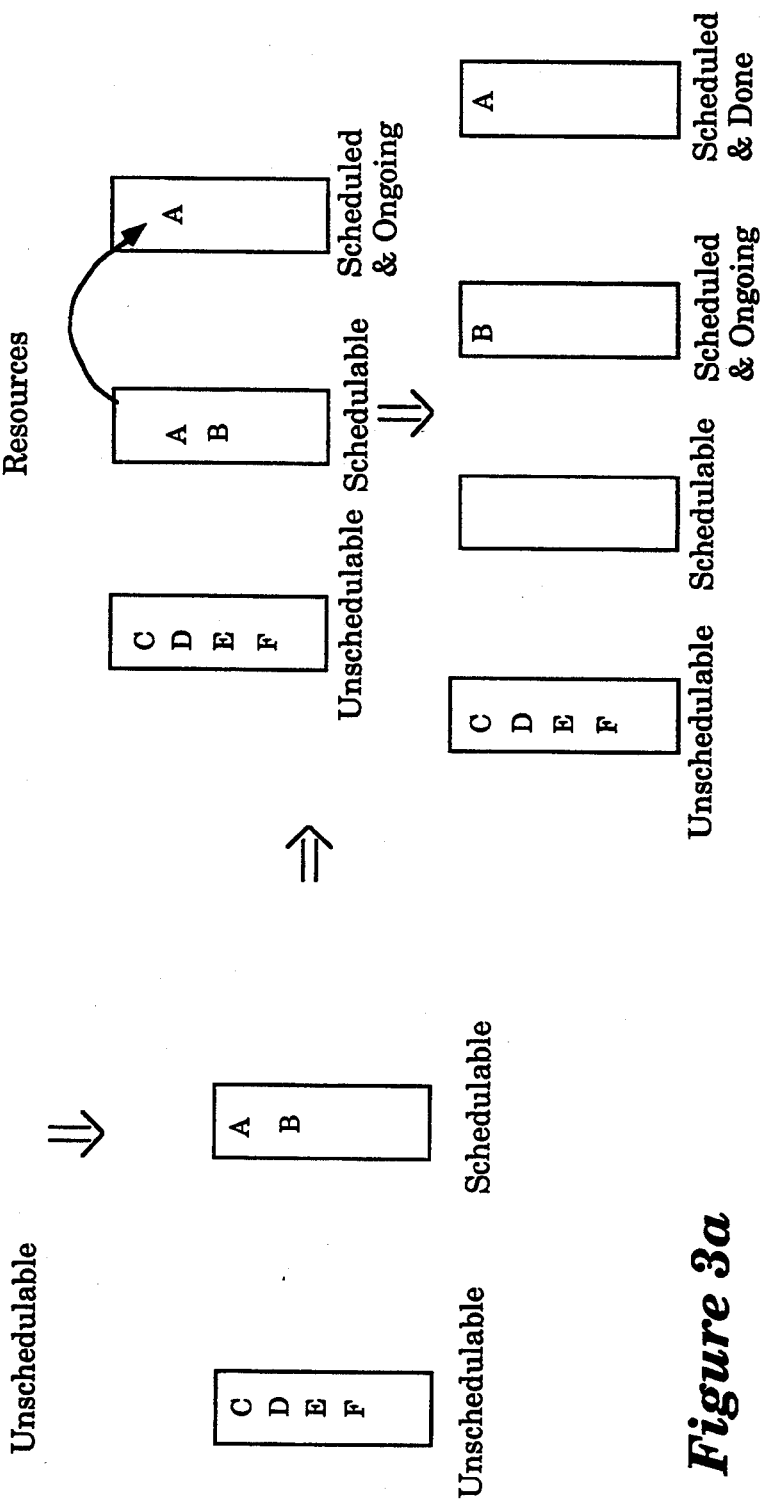
Figure 3B:
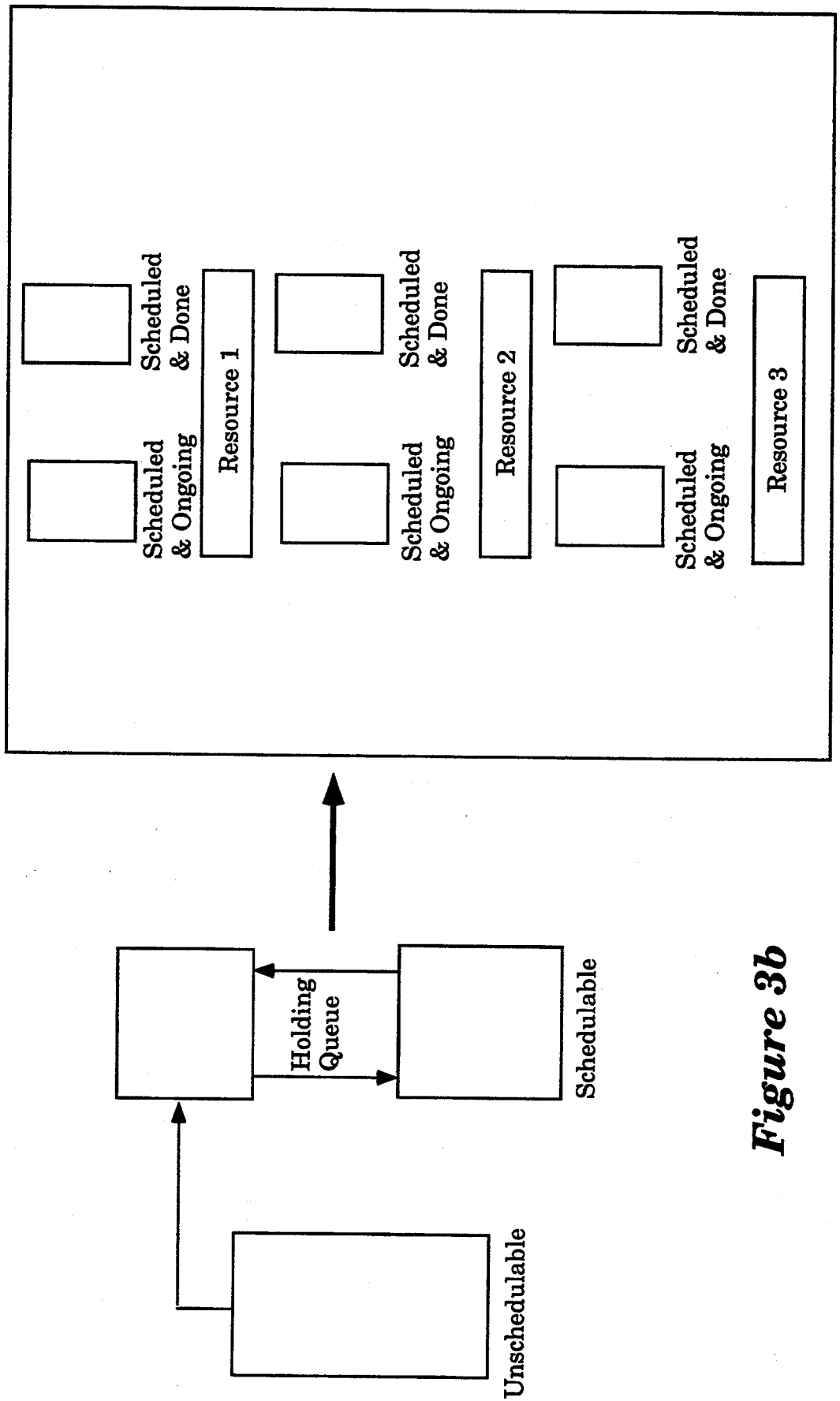
Figure 3C:
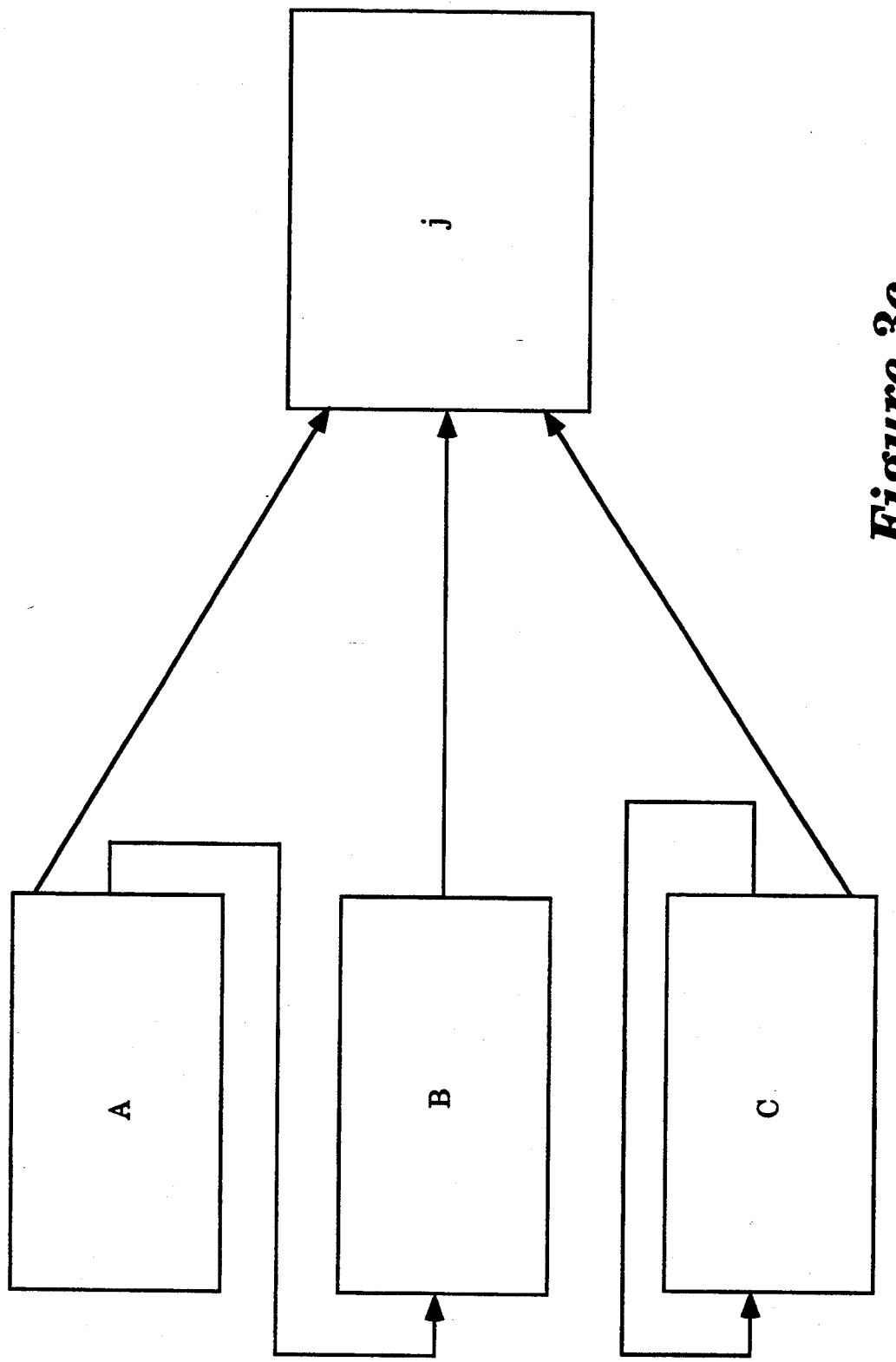

Scheduling may be described pictorially by reference to FIGS. 3a, 3b, and 3c. Activities are initially unschedulable. Associated with each activity are the resources and the amount of time with respect to a resource each activity requires. Furthermore, the amount of slack time for each activity is known. The resources are initialized by identifying the FTE Available, as well as a shortfall calender, for each resource. The activities can be moved to the schedulable list if the activity has no predecessor activities which are not scheduled, that is, those activities located on the unschedulable or schedulable list. Referring to FIG. 3a, for example, activities A and B, having no unschedulable predecessors, are moved to the schedulable list while activities C, D, E and F remain on the unschedulable list. The activities on the schedulable list are then ordered according to the amount of least slack. Thus activity A, which has a smaller amount of slack than activity B, is scheduled and moved from the schedulable list to the scheduled and on-going list. The resources utilized by activity A are allocated thereby identifying, for example, that activity a requires 0.25 of resource 1, 0.5 of resource 3 and 1 of resource 5.

Activity B is then moved to the scheduled and ongoing list and activity B resources are allocated. However, activity B requires one full day of resource 1 and at that time, only 0.75 is available due to the fact that activity A requires 0.25 of resource 1. Thus a resource arc is added, which provides temporal precedence to activity A so that activity A will be performed prior to activity B. Activity A is then moved to the scheduled and done list and activity B, having its resource arcs included showing it has to wait for resource 1 to be used by activity A before it can utilize resource 1, is moved to the scheduled and on-going list. The process continues by determining if any of the activities on the unschedulable list have predecessor activities which are now scheduled. Thus for example, if activity E requires that activity B be performed first, B is now on the scheduled list and therefore activity E can be moved to the schedulable list to be processed and scheduled.

This iterative process continues until all activities are scheduled. Although the list processing approach can be implemented in many ways, one technique is to provide a list of unschedulable activities and then a plurality of scheduled and on-going and scheduled and done activities as it pertains to each resource. Thus, the order in which resources perform tasks are identified as well as the sequence of execution of activities as defined by the arcs between activities and the ordering of predecessor activities for each activity.

FIG. 3c is illustrative of the resource arcs that may be imposed during the list processing of the schedule. For example, FIG. 3c shows four activities A, B, C and j, where j requires execution of activities A, B and C before it can be executed. During scheduling it has been determined because of the amount of available slack, activity A has first access to a resource which activity B and C also require. Furthermore, activity B has precedence over activity C in accessing that same resource because it has less slack than activity C. Thus resource arcs are added, as shown by the dotted line, to identify that activity A first has access to the resource after which activity B has access followed by activity C. At the conclusion of activity C's processing utilizing the resource, activity j can be processed.

The preferred embodiment is illustrated in FIG. 3b. A holding queue is provided. Each activity ready to be placed on the schedulable list is first placed in the holding queue. The activities in the holding queue are held until the schedulable list has been emptied. If an activity requires a resource which has been scheduled for an activity recently located on the schedulable list (subsequent to the last time the schedulable list had been emptied), the activity is moved back to the holding queue for subsequent scheduling. This somewhat minimizes the sub-optimal effects caused by scheduling based solely on least slack and prevents a low priority activity from being scheduled before a high priority activity when both activities require the same resource.

This scheduling procedure is described in further detail with reference to FIG. 2. Once the duration schedule has been evaluated and the slack time calculated for each activity, the Schedulable list is initialized at box 105 by assigning to it all activities with no predecessor activities. The activities on the Schedulable list are prioritized based on least available slack.

Following this initialization stage of the process, the iterative portion of the process starting at box 201 is begun and repeated until all activities have been scheduled. Subsequent stages of the iterative portion of the process return to the procedure represented by box 201 via input box 1A.

The first step in the iterative portion of the process is to determine if the scheduling process is complete. This is done by looking first to the Schedulable list at box 201, and if it is empty, turning to the holding queue at box 202. If the activity holding queue is empty as well, scheduling has been completed. The completed schedule is then displayed on the display monitor or output to a similar output device to the user (box 204). If the holding queue is not empty at box 202, the holding queue activities are moved to the Schedulable list at box 205.

The activity of highest priority (i.e. the one with the least available slack time) is selected at box 206. This activity is removed from the Schedulable list and, if it is constrainable, resource arcs are added as necessary. It is at this point that resource usage and the availability of resources are taken into account.

Figure 6:
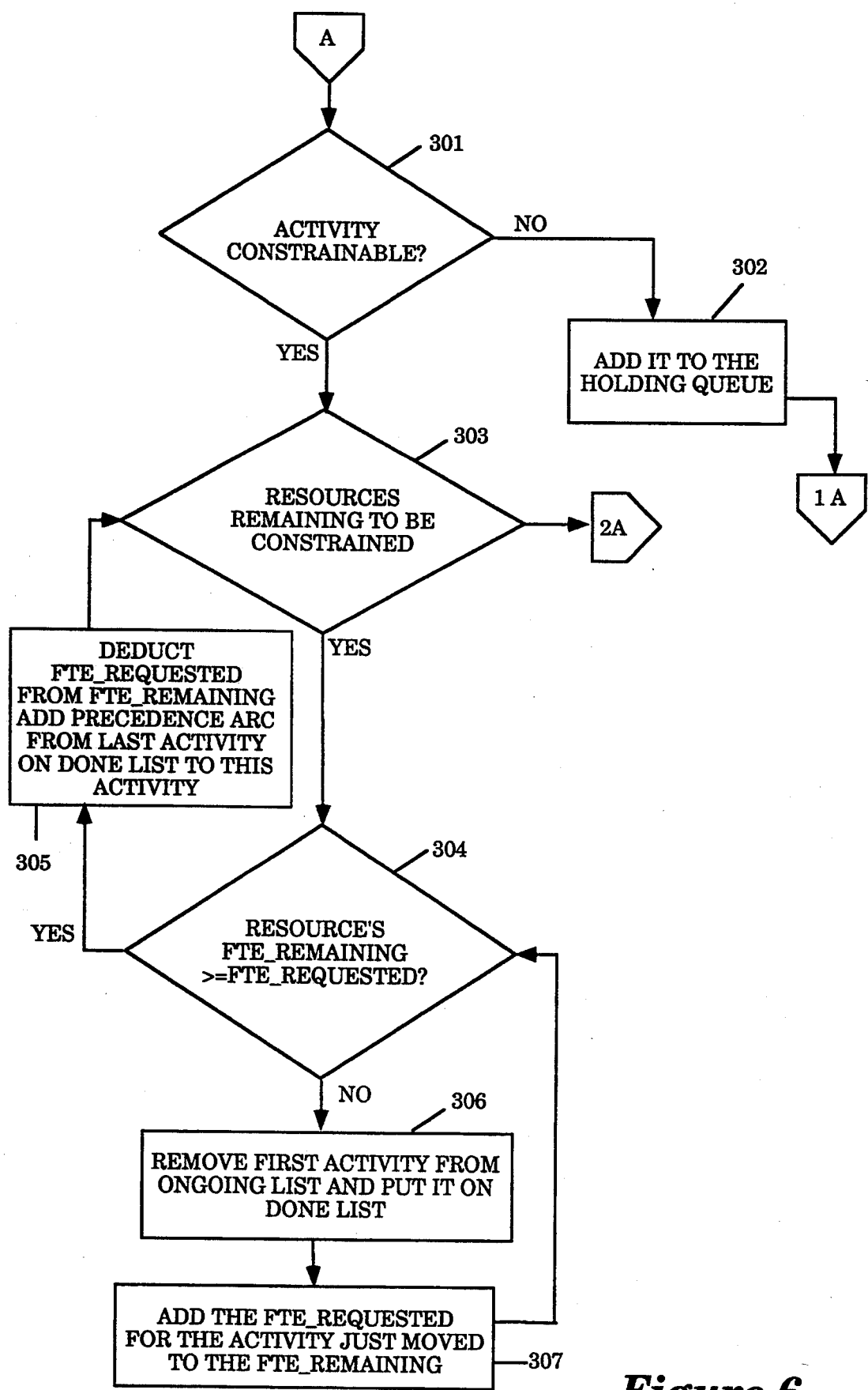
FIG. 6 is a more detailed flowchart of a portion of the general flowchart for resource constrainability.

The constrainability evaluation will be described with reference to FIG. 6. Input box A of this portion is directed from box 206 of FIG. 2.

An activity is said to be constrainable if it is selected for scheduling and passes the following condition: an activity is not constrainable if any of the resources it will require have already been scheduled for another activity since the Schedulable list was last filled. A list of resources used is maintained and checked at box 301. This list of resources used is cleared each time the Schedulable list is refilled from the holding queue. Activities not constrainable at box 301 are added back to the holding queue at box 302. Another iteration of the process then begins again at box 1A of FIG. 2. Once all resources have been constrained as determined at box 303, the process is resumed at box 207 of FIG. 2.

The present invention's model of resource availability specifies each resource as a full-time equivalent (FTE) level of effort and a calendar of shortfalls. The full-time equivalent level of effort is referred to as FTE Available. The procedure, represented in boxes 303 through 307, guarantees that a resource will never be scheduled for more than the FTE Available at any time.

First, at decision box 304 the determination is made as to whether the resource's FTE_Remaining will allow the resource to be concurrently scheduled. FTE_Remaining is the amount of resource available after all constraints to ongoing activities (those in the Scheduled and Ongoing list). The resource can be concurrently scheduled if FTE_Remaining is not less than that requested by the activity (FTE_Requested). If the activity can be scheduled, at box 305 the amount FTE_Requested is deducted from the resource's FTE_Remaining and a resource precedence arc is added from the last activity placed on the Scheduled and Done list to the current activity if a precedence arc doesn't already exist. The procedure then returns to see if there are more activities to be constrained at step 303.

If the resource's FTE Remaining is less than the FTE needed by the activity (FTE_Requested) at box 304, at step 306 the first activity from the resource's Scheduled and Ongoing List is put on the done list indicating that the activity must finish before the current one can start and use the resource. Once the activity is moved to the Scheduled and Ongoing list, at step 307, the moved activity's FTE requirement (FTE_Requested) is added to the FTE Remaining. This iteration is repeated until there is enough FTE_Remaining to satisfy the FTE_Requested of the current activity. The process then continues at box 305 as described above wherein the amount of FTE_Requested is deducted from the resource's FTE Remaining and a resource precedence arc is added from the last activity placed on the Scheduled and Done list to the current activity if a precedence arc doesn't already exist.

Having completed constraining the activity to account for all resource requirements, the process continues at box 207 of FIG. 2. Step 207 calls for calculating the maximum normal distribution for the start time of the current activity ($^FM^{\mu,\nu}$). This requires the execution of an algorithm for calculating a maximum normal distribution which will be described with reference to FIG. 7. This algorithm is derived from the reference, Clark, C. E., "The Greatest of a Finite Set of Random Variables", Operations Research, March-April 1961, pp. 145–162; described below.

By adding and including resource arcs in addition to the precedence arcs in the determination of the start time of an activity, the start time allows for resource constraints while preserving the probabilistic nature of the network. The process described herein selectively adds resource arcs, only when needed, thus providing an effective resource constrained schedule.

The start time (M) for an activity is the maximum of the cumulative durations of its immediate predecessors. In the case of two incoming activities:

$$M = max(T_1, T_2) \tag{1}$$

where $T_1$ and $T_2$ are the cumulative durations of the incoming activities.

When uncertainty about activity durations is introduced, relation (1) still holds, but M, $T_1$ and $T_2$ are now random variables. When activity durations are uncertain, project management tools should produce the probability distribution on finish date or estimate a finish date at a selected confidence level. (e.g., a finish date which has an 85% chance of being met). The analysis herein assumes that start and finish times are normally distributed, a reasonable approximation when there are many activities in a network. Since a normal distribution is fully specified by a mean and variance, the objective of the algorithm is to calculate a mean and variance for each activity's start and finish times. This task is not trivial since:

$$M^\mu \neq max(T_1^\mu, T_2^\mu) \text{ and } M^\sigma \neq max(T_1^\sigma, T_2^\sigma) \tag{2}$$

where the superscript $\mu$ denotes expected value and $\sigma$ denotes standard deviation.

Figure 7:
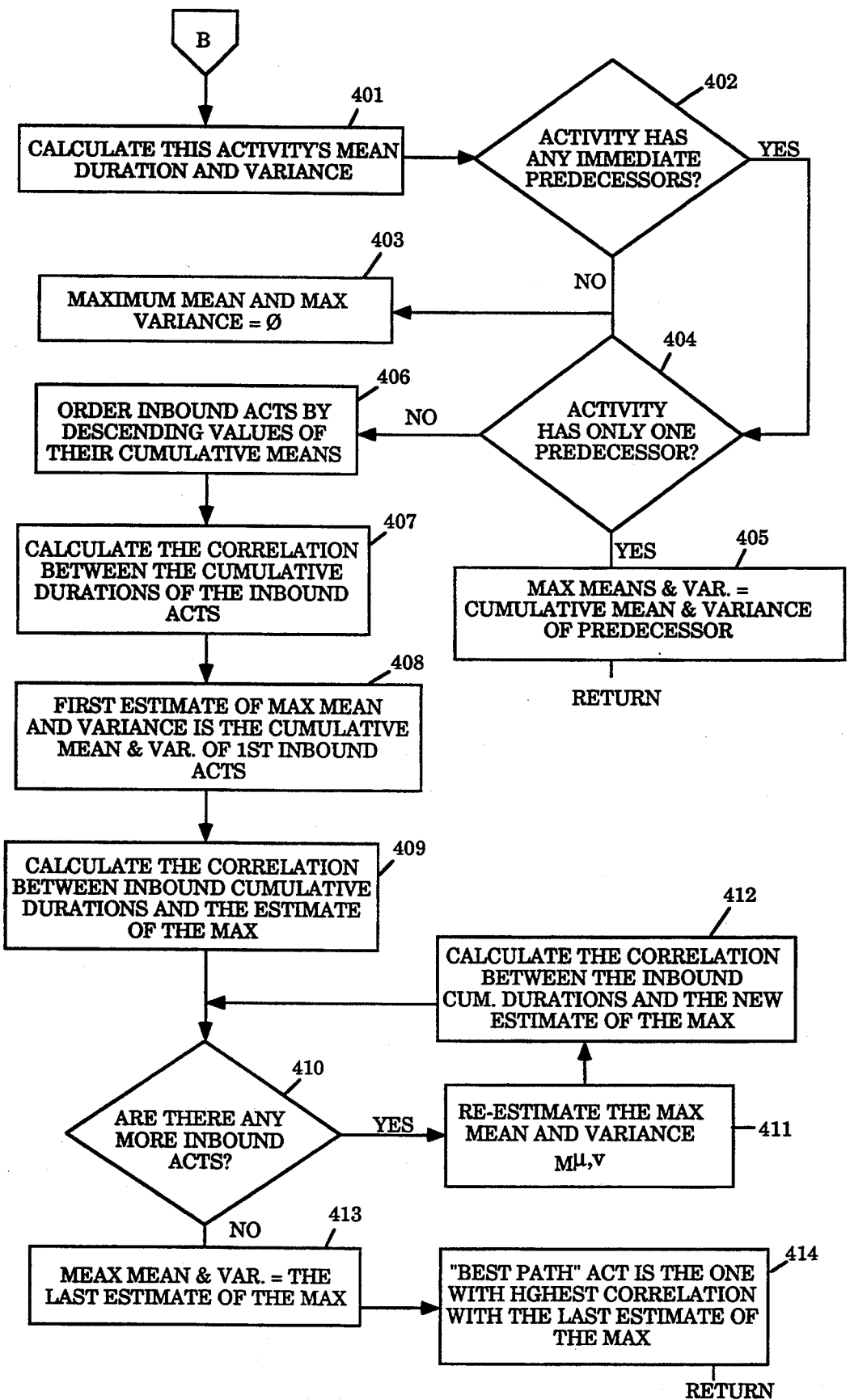
FIG. 7 is a more detailed flowchart of a portion of the general flowchart for calculating the maximum mean and variance of the start time of activities.

In FIG. 7, the first step of the algorithm is to calculate the mean duration and variance for the current activity. Although any form of probability distribution may be used, it is preferable to use a parametric form with easy-to-access parameters and easy-to-calculate mean and variance. The method will be illustrated using the Triangular distribution, with the parameters pessimistic, most likely, and optimistic duration. Therefore, using estimates for pessimistic (pess.), optimistic (opt.) and most likely (m.l.) durations, The expected or mean duration is defined as:

$$\mu = \frac{\text{optimistic} + \text{most likely} + \text{pessimistic}}{3} \tag{3}$$

The variance is defined as:

-continued $$t^\nu = \frac{[(pess - opt)^2 + (m.l - opt) * (m.l - pess)]}{18} \quad (4)$$

Decision box 402 determines if the activity has any immediate predecessors. If there are none, then the maximum mean and variance for the start time of the current activity will be zero (it can start at any time because it is not dependent on incoming activities.) Zero is then returned at box 403. Decision box 404 determines if the current activity has only one predecessor. If yes, then the maximum mean and variance is set equal to the cumulative mean and variance of the predecessor activity at box 405. That is, with only one inbound activity:

$$F_{M^{\mu, \nu}} = T^{\mu, \nu} \quad (5)$$

Now, when there are multiple inbound activities they are ordered at step 406 by descending values of their cumulative means $T_j^\mu$. This is done to keep $\alpha$ (equation 9) positive. Following this, it is necessary at box 407 to calculate the correlation between the cumulative durations of the inbound activities.

The technique utilized to generate this result was initially developed by Clark for non-resource constrained scheduling. The assumption that the distributions are normal is used in the equations to determine mean and variance which apply to the maximum of two "normally distributed" variables. Also, as explained by Clark, whenever a maximum is defined over more than two variables (inbound activity durations), we must apply the equations repetitively. i.e., $$max(T_1, T_2, T_3) = max(T_1, max(T_2, T_3)) \quad (6)$$

At step 408, the first estimate of the maximum mean and variance is the cumulative mean and variance of the first inbound activity. The iterative process across the inbound activities is indexed by k, thus for each activity:

$$m_k = max(T_k, m_{k-1}); \quad m_1 = T_1 \quad (7)$$

For clarity, the equations below are also indexed for each activity j in the network, i.e. at each point where the new start time is defined as the maximum of all the inbound times.

The objective is to compute $M_j^\mu$ and $M_j^\nu$ at each activity where $M_j^\mu$ is the expected cumulative duration to activity j (expected start time there) and $M_j^\nu$ is the variance of cumulative duration to activity j. Substituting terms directly into Clark's equations develops the equations for considering each inbound activity one at a time.

Define:

$$a_{kj} = [T^\nu_{Akj} + m^\nu_{(k-1)j} - 2C(T_{Akj}, m_{(k-1)j})*T^\sigma_{Akj}*m^\sigma_{(k-1)j}]^{\frac{1}{2}} \quad (8)$$

$$\alpha_{kj} = (m^\mu_{(k-1)j} - T^\mu_{Akj})/a_{kj} \quad (9)$$

$$m^\mu_{kj} = T^\mu_{Akj}*N(-\alpha_{kj}) + m^\mu_{(k-1)j}*N(\alpha_{kj}) + a_{kj}*n(\alpha_{kj}) \quad (10)$$

$$m^\nu_{kj} = (T^{\mu 2}_{Akj} + T^\nu_{Akj})*N(-\alpha_{kj}) + (m^{\mu 2}_{(k-1)j} + m^\nu_{(k-1)j})*N(\alpha_{kj}) + (T^\mu_{Akj} + m^\mu_{(k-1)j})*a_{kj}*n(\alpha_{kj}) - m^{\mu 2}_{kj} \quad (11)$$

$$C(T_{ij}, m_{kj}) = [T^\sigma_{kj}*C(T_{kj}, T_{ij}) + (m^\sigma_{(k-1)j}*C(T_{ij}, m_{(k-1)j}) - T^\sigma_{kj}*C(T_{kj}, T_{ij}))*N(-\alpha_{kj})]/m^\pi_{kj} \quad (12)$$

where $2 \leq k \leq I$ and n(x) and N(x) are the standard normal probability density function and the standard normal cumulative distribution functions, respectively. Equation (12) satisfies step 409 for calculating the correlation between inbound cumulative durations and the estimate of the maximums. Note that these equations assume that the variable $T_k^\mu$ is ordered with decreasing mean as was done in step 406 so that $\alpha$ is always positive.

These steps are repeated at boxes 410, 411 and 412 until the correlation between the inbound cumulative durations and estimates of the maximum have been calculated considering all inbound acts.

The final result at step 413 each activity is:

$$M_j^\mu = m_{Ij}$$

$$M_j^\nu = m_{Ij}^\nu$$

This set of dynamic equations in the index k requires the following initial conditions for a solution:

$$m_{1j}^\mu = T_{1j}^\mu;$$

$$m_{1j}^\nu = T_{1j}^\nu;$$

$$C(T_{Aij}, T_{Akj}) \text{known value}$$

where $C(T_{Aij}, T_{Akj})$ is the correlation between cumulative durations approximated by $C(T_{best\ path\ ij}, T_{best\ path\ (i+1)j})$ which was determined at box 407.

In a large network of activities, calculating the term $C(T_{Aij}, T_{Akj})$ would be extremely computationally intensive because it depends on all activity times that can possibly impact $T_{Aij}$ and $T_{Akj}$ i.e., all paths leading to these two activities. The additional simplifying assumption used to make the computation of this term manageable is to select a single "best path" back from each $T_{Akj}$ and use it as a surrogate for purposes of computing the required correlation coefficients.

Once a "best path" is selected for each of $T_{Aij}$ and $T_{Akj}$, the correlation coefficient is computed by separating the dependent and independent parts of the two "best paths" ($J_{ikj}$).. We can now compute:

$$C(T_{Aij}, T_{Akj}) = M_{Jikj}^\nu/((T_{Aij}^\sigma, T_{Akj}^\sigma); 1 \leq k \leq I$$
$$C(T_{Aij}, T_{Akj}) = 1.0 \text{ when } k=i; \text{ and}$$
$$C(T_{Aij}, T_{Akj}) = C(T_{Aij}, T_{Akj}) \quad (13)$$

The following equations verify that we now have sufficient initial conditions to compute the correlation coefficients needed. For k=1, 2 and i=1, 2, we have:

$$C(T_{A1j}, m_{1j}) = C(T_{A1j}, T_{A1j}) = 1.0$$
$$C(T_{A1j}, m_{2j}) = [T_{2j}^\sigma*C(T_{A2j}, T_{A1j}) + \{T_{A1j}^\sigma - T_{A2j}^\sigma*C(T_{A2j}, T_{A1j})\}*N(-\alpha_{2j})]/m_{2j}^\sigma$$
$$C(T_{A2j}, m_{1j}) = C(T_{A2j}, T_{A1j})$$
$$C(T_{A2j}, m_{2j}) = ]T_{A2j}^\mu + \{T_{A1j}^\sigma*C(T_{A2j}, T_{A1j}) - T_{A2j}^\sigma\}*N(-\alpha_{2j})]/m_{2j}^\sigma \quad (14)$$

The single remaining task necessary to complete the description of the algorithm is to specify how the "best path" is selected at step 414. The assumption used herein, at each activity in the network, is to select the single incoming activity's cumulative duration which is most correlated with the random start time for the current activity. The best path is then determined by induction. First, the best path back from the initial activity of the network is null. Then, assuming that a single best path has already been selected for all activities prior to j, the correlation of each inbound $T_{Aij}$ with the maximum can be calculated by (12). The arc index k* where $C(T_{Ak*j}, M_{1j}) = \max\{C(T_{A1j}, m_{1j}), C(T_{A2j}, m_{1j}), \ldots, C(T_{Aij}, m_{1j})\}$ is the index of the arc which is the best path back from the current activity; that is, $b_j = Ak*_j$.

Figure 4:
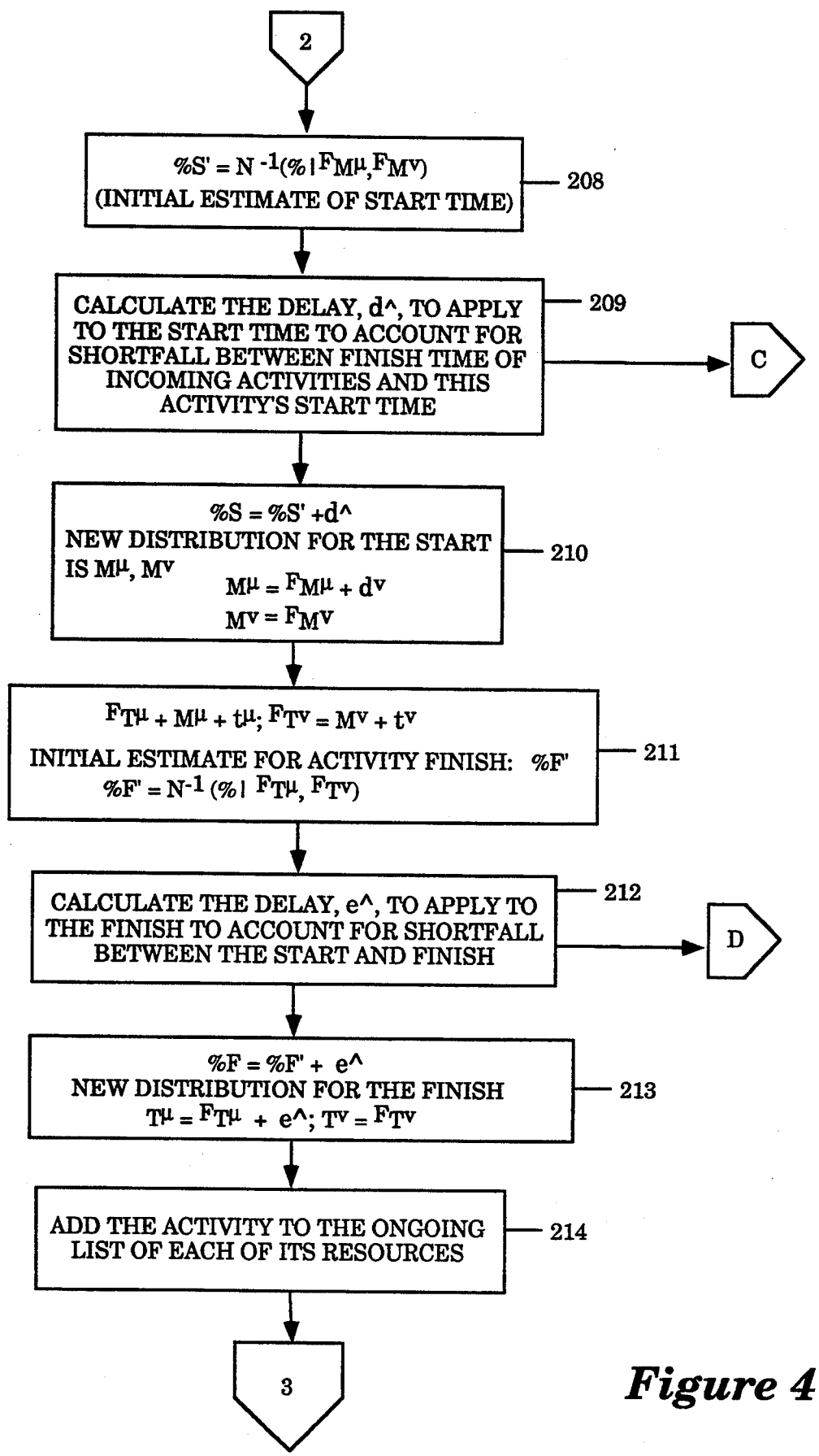
FIG. 4 is the intermediate portion of the general flowchart of the scheduling system in accordance with the present invention.

Finally, after all inbound activities are processed, the maximum mean and variance are set to the last estimate at step 413, concluding the current iteration of this algorithm for determining the start time of the current activity to be scheduled. The procedure then returns to the main iterative portion at step 208, (FIG. 4).

With the distribution for the start time of the activity known, an estimated start time point, %S', for the current activity at the % confidence level is determined. However, it assumes no shortfalls between the finish times of incoming activities and the start time of the current activity.

Once the activity has been scheduled, the start time %S' of the scheduled activity is adjusted to take into account resource shortfalls which occur during a project. A shortfall occurs when the resource is inoperative due to, for example, a person resource going on vacation or a mechanical resource being shut down for maintenance.

In order to consider an activity finished (i.e., to determine the finish time of an activity), the total effort, not duration, must be accomplished at the specified % confidence level. The distribution on total effort (which is different for each resource) is specified by the relationship,

*total effort = duration × FTE* where FTE is a known constant and duration is a random variable with probability distribution given by mean and variance data. The model utilized in the present invention allows FTE to differ from resource to resource but assumes the duration distribution is common to all resources on a given activity. Because FTE is known, the above relation uniquely determines the duration necessary to conserve the % confidence level on total effort.

Shortfall can delay an activity in two ways. If it is encountered between the start and finish time of an activity, the activity must be delayed to the point where enough time has elapsed to maintain the specified % confidence level on total effort. For example, if FTE is reduced by one-third by a shortfall, the activity duration must be increased by 50%. The second way a shortfall can cause delay is if it occurs between the finish of one activity and the start of the next. In that case the start of the current activity must be delayed to account for the probability that the finish time of any inbound activity might extend into the shortfall. If there are multiple inbound activities, each activity must be checked for the occurrence of a shortfall between their finish times and the start of the current activity.

Furthermore, any time a delay occurs, the delay interval itself must be checked for shortfall and the delay interval must be lengthened if any shortfall is encountered.

To take into account the shortfalls which may occur between the finish times of inbound activities and the current activity, at step 209, the delay, $d^\wedge$, is calculated. $d^\wedge$ is the amount the start time is delayed to account for shortfalls between the finish times of incoming activities and the current activity's start time. See FIGS. 10–13 for a graphical depiction of the variables used in the delay calculations.

The following function computes the additional delay which must be added to a time, m, to account for a shortfall of $(1-r)$ FTE Available occurring at point SF of duration V for resource i $$d_i(m) = d_i(m|SF_i, r_i, V_i) = R_i[(m - SF_i)^* \qquad (16)$$
$$u(m, SF_i) - (m - SF_i - V_i r_i)u(m, SF_i + V_i r_i)]$$
$$= 0 \quad \text{if } m \leq SF_i$$
$$= R_i(m - SF_i) \text{ if } SF_i < m \leq SF_i + V_i r_i \text{ and } r_i > 0$$
$$= V \text{ if } SF_i < m \text{ and } r_i = 0$$
$$= (1 - r_i) V_i \text{ if } SF_i + V_i r_i < m$$

Figure 13:
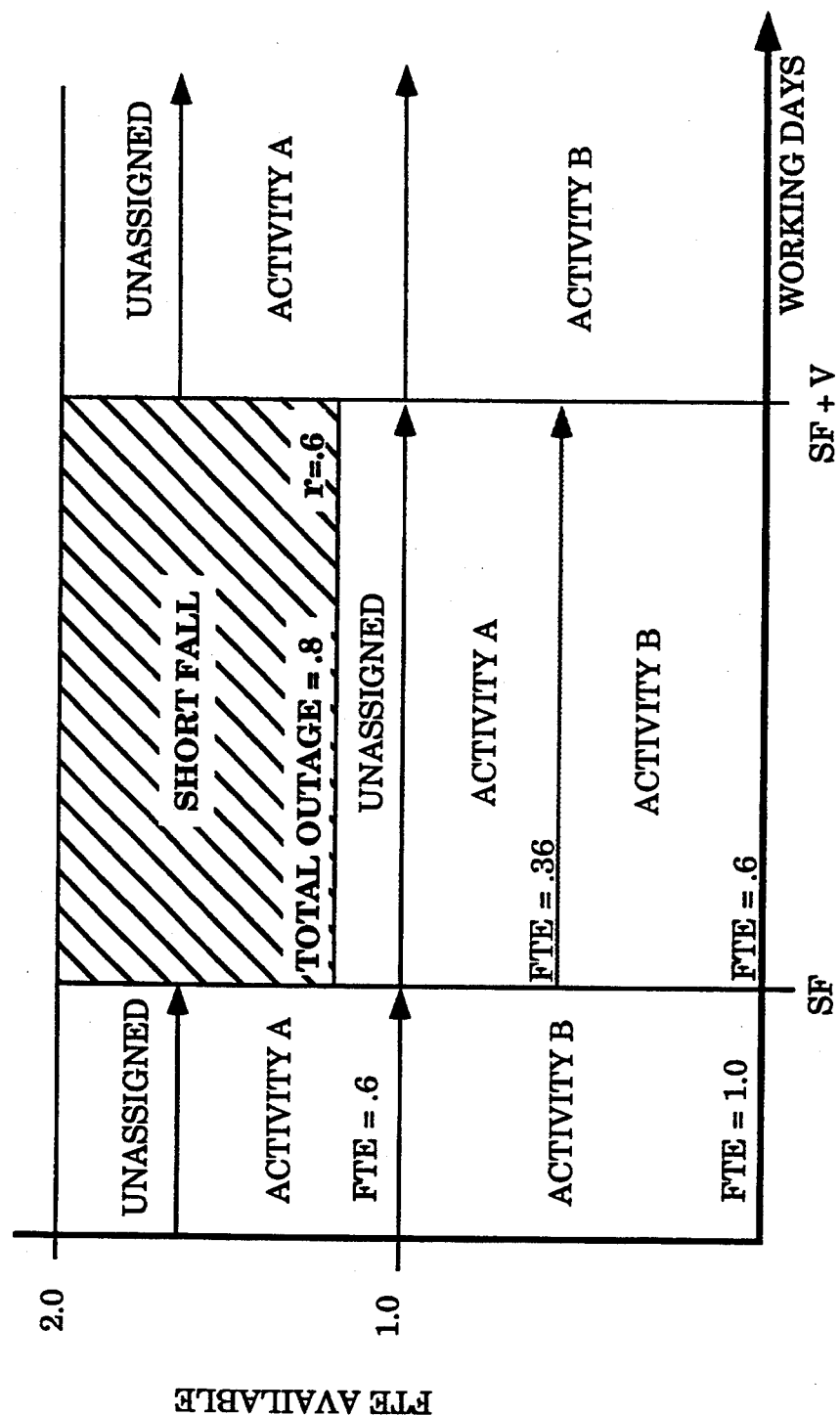
FIG. 13 graphically illustrates the variables used to compute the shortfall delay.

The effect of this delay function is to delay all ongoing activities proportionately as shown in FIG. 13.

The % confidence start time of an activity, %S, is delayed by an expected delay $d^\wedge$ if there is any shortfall between the finish of any inbound activity, i (%$F_i$) and the estimated start of the current activity (%S'). It has been determined that to preserve % confidence it is sufficient to approximate the several delays caused by several inbound activities by a single average delay $d^\wedge$. The delay is determined as a weighted average across inbound activities. The weight is the probability that the inbound activity will be the longest; it is multiplied by the activity's respective shortfall delay caused by that activity passing through one or more shortfalls as it extends to %S'. See FIGS. 10 and 11.

$$\%S = \%S' + d^\wedge d^\wedge = \Sigma_i cr_i > d_i(\%S') \qquad (17)$$

$$cr_i > = ([1 - N_i(\%S')]cr_i)/(\Sigma_j[1 - N_j(\%S')]cr_j) \qquad (18)$$

$$cr_i = cr_i(^F M^\mu) = \phi_i/\Sigma_j \phi_j \qquad (19)$$

The term crt, the criticality index, is the probability, for each inbound activity, that it is the longest inbound activity to the current activity; it is indicative of the probability that the inbound activity will extend beyond its determined finish time %$F_i$ (due to the uncertain nature of the activity's duration). A computationally fast approximation of cri is suggested by viewing cri as an expected value of a one-to-one change of variables. To do this we need an approximation for $cr_i(m)$, which in general is a byproduct of the joint density function on $\{T_i\}$. Although it is not readily available, we can model it quite accurately from its interpretation as the conditional criticality factor. We use the conditional frequency of activity i winning when the maximum is m, $$cr_i(m) = \phi_i(m,m)/(\Sigma_j \phi_j(m,m))$$

$\phi_i(T_i, {^F}M)$ = the joint density function used by cri(m) to reflect the correlation $F_M{^{\mu,\nu}}$ of each inbound activity with the maximum normal distribution of the start time for the activity ($^F$M).

The computational rule for the joint density function is:

$$\phi_i = \phi(^F M^\mu, ^F M^\mu | T_i^\mu{^\Sigma}, F_M{^{\mu\sigma}}, cor(T_i, {^F}M))$$
$$\phi(z_1, z_2) = 1/[2\pi(1-\rho^2)^{\frac{1}{2}}]\exp$$
$$[-(z_1{^2} - 2\rho z_1 z_2 + z_2{^2})/(2\{1-\rho^2\})] \qquad (20)$$

$$\rho = cor(T_i, {^F}M)$$

$$z_1 = (^F M\mu - T_i^\mu)/T_i^\sigma$$

$$z_2 = (^F M^\mu - {^F}M^\mu)/{^F}M^\sigma$$

Note that $z_2$ is zero here, so $$\phi(z_1, z_2) = 1/[2\pi(1-\rho^2)^{\frac{1}{2}}]exp\,[-(z_1^2/2\{1-\pi^2\})] \quad (21)$$

For boundary conditions, the following rules apply:
If $^FM^\sigma=0$, there is no uncertainty in any of the incoming arcs (all $T_i^\sigma$ are zero) and all $\phi 1$ are zero except where $T_i^\mu=^FM^\mu$ in which case $\phi_i=1$.
If $T_i^\sigma$ is close to zero and $^FM^\mu\text{-}T_i^\mu$ is also close to zero, $\phi_1=1$.
If $T_i^\sigma$ is close to zero and $^FM^\mu\text{-}T_i^\mu$ is not, then $\phi_1=0$.
If $1\text{-}\rho^2$ is close to zero and $z_1$ is also close to zero, the exponential term is increasing rapidly and $\phi_i$ can be set to an arbitrary large number (e.g., 50).
If $1\text{-}\rho^2$ is close to zero and $z_1$ is not, then $\phi_i$ is 0.
If $\Sigma_i\phi_i=0$, reset $\phi(\max(t_i^\mu))=1$. Alternatively, recalculate $\phi_i$ using the formula $\phi_i = 1\text{-}z_{1i}/\Sigma_jz_1$.

Figure 8:
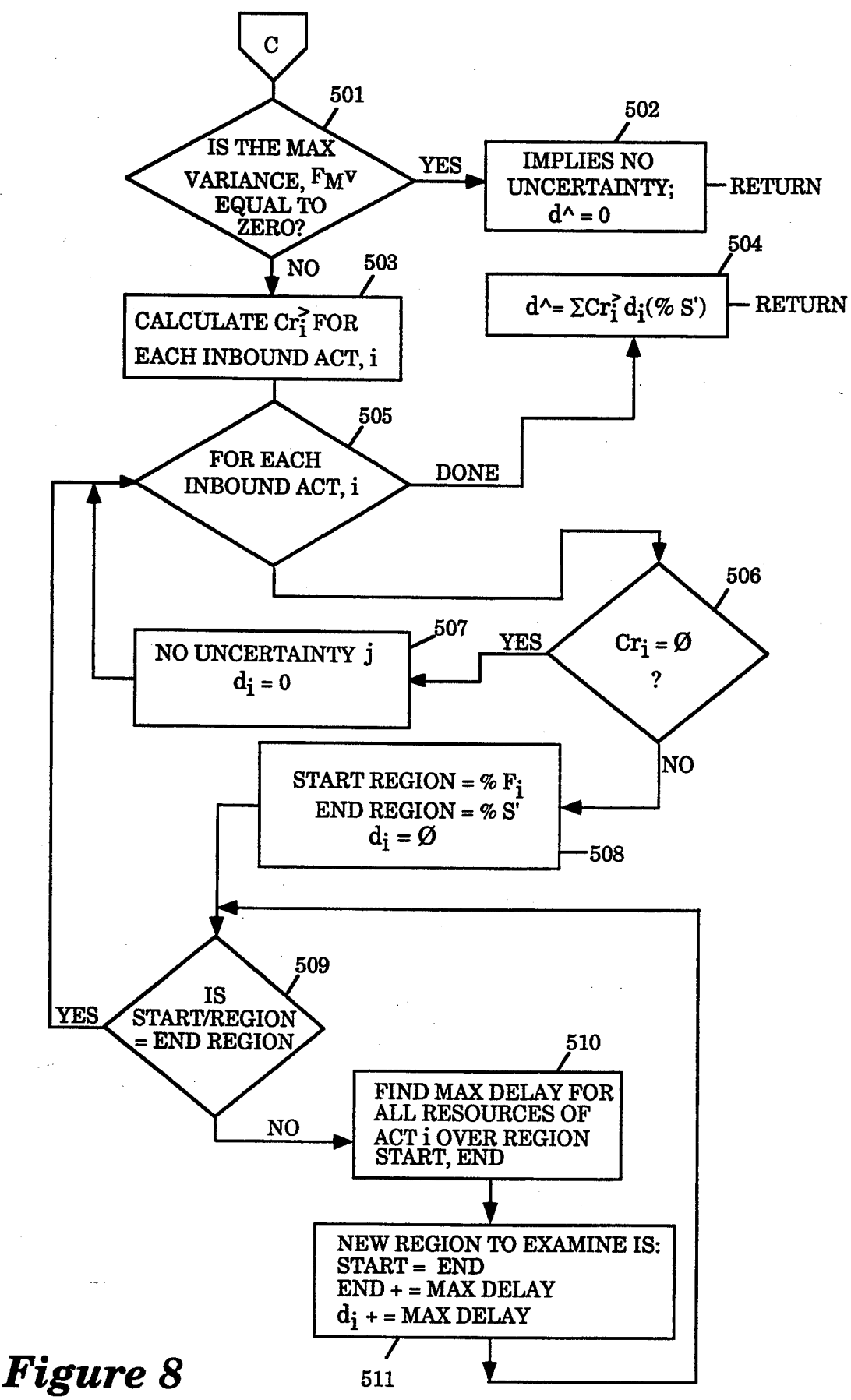
FIG. 8 is a more detailed flowchart of a portion of the general flowchart for calculating the delay in an activity's start time due to shortfalls preceding the activity's start time.

The detailed procedure for calculating d is represented in FIG. 8. At box 501, if the Maximum Cumulative variance ($^FM^\nu$) of the current activity is zero, there is no uncertainty in any of the finish times of the inbound activities, and thus there is no chance that a delay will be encountered between any of their finish times and the start time of the current activity. The procedure in that case returns d =0 at box 502.

If there is uncertainty about the start time of the activity ($^FM^\nu$ is greater than zero), then at box 503 $Cr_i >$, the probability that the duration of an activity might extend past its finish time $\%F_i$, is calculated for each inbound activity, $i$, using the above equations 18, 19, 20 and 21.

Next, at box 505, an iteration over each inbound activity, i, is begun to search its resources' shortfall calendars over $\%F_i$ and $\%S'$ for shortfalls. If there is no uncertainty at decision box 506, then the delay for activity i is set to zero at box 507.

If there is uncertainty in the inbound activity's finish time, the region of the shortfall calendar search is initialized to $\%F_i$, $\%S'$, and the delay is initialized to zero at box 508.

At box 510, the shortfall calendar for each resource used by activity i over the region of interest is searched. If shortfall is found for any resource, its delay factor is calculated using equation 16. In the case where there is more than one resource used by activity i, $d_i$ is incremented by the maximum of all the resources' delay factors at box 511. Also at box 511, the region to search is redefined to further examine the region bounded by the previous end and the previous end plus $d_i$.

The search for shortfall is completed when the region of interest collapses to zero as decided at box 509.

When all the inbound activities have been examined for shortfall in the iterative procedure begun at box 503, the amount of delay to add to $\%S'$ is calculated using equation 17 at box 504 to determine the start time $\%S$. The procedure then returns to the main iterative loop at box 210.

Having accounted for all shortfall delays prior to the activity's estimated start time $\%S'$, its start time, $\%S$ and the new distribution, $M^\mu$, $M^\nu$, are set at box 210:

$$\%S = \%S' + d^\wedge$$

$$M^\mu = ^FM^\mu \mu d^\wedge$$

$$M^\nu = ^FM^\nu$$

Once the start time $\%S$ has been determined, it is necessary to estimate an initial finish time for the current activity:

$$^FT^{\mu\nu} = M^{\mu\nu} + t^{\mu\nu}$$

where t is a duration of the activity assuming there are no shortfalls encountered, M is the expected start time, and $^FT$ is the finish time point for the activity assuming no shortfalls after start time $\%S$.

Therefore, the initial estimate for the finish time at box 211 is:

$$\%F = N^{-1}(\% \mid ^FT^\mu, ^FT^\nu)$$

Shortfalls not only delay the start time of an activity by occurring prior to its start time. Any shortfalls that occur following the start of an activity have the effect of delaying the finish time by an exact amount. Since the delay on the finish time is not impacted by uncertainty its calculation is simply the result of applying equation 16 to shortfalls found in the region $\%S\text{-}\%F'$ (see FIGS. 10 and 12).

Figure 9:
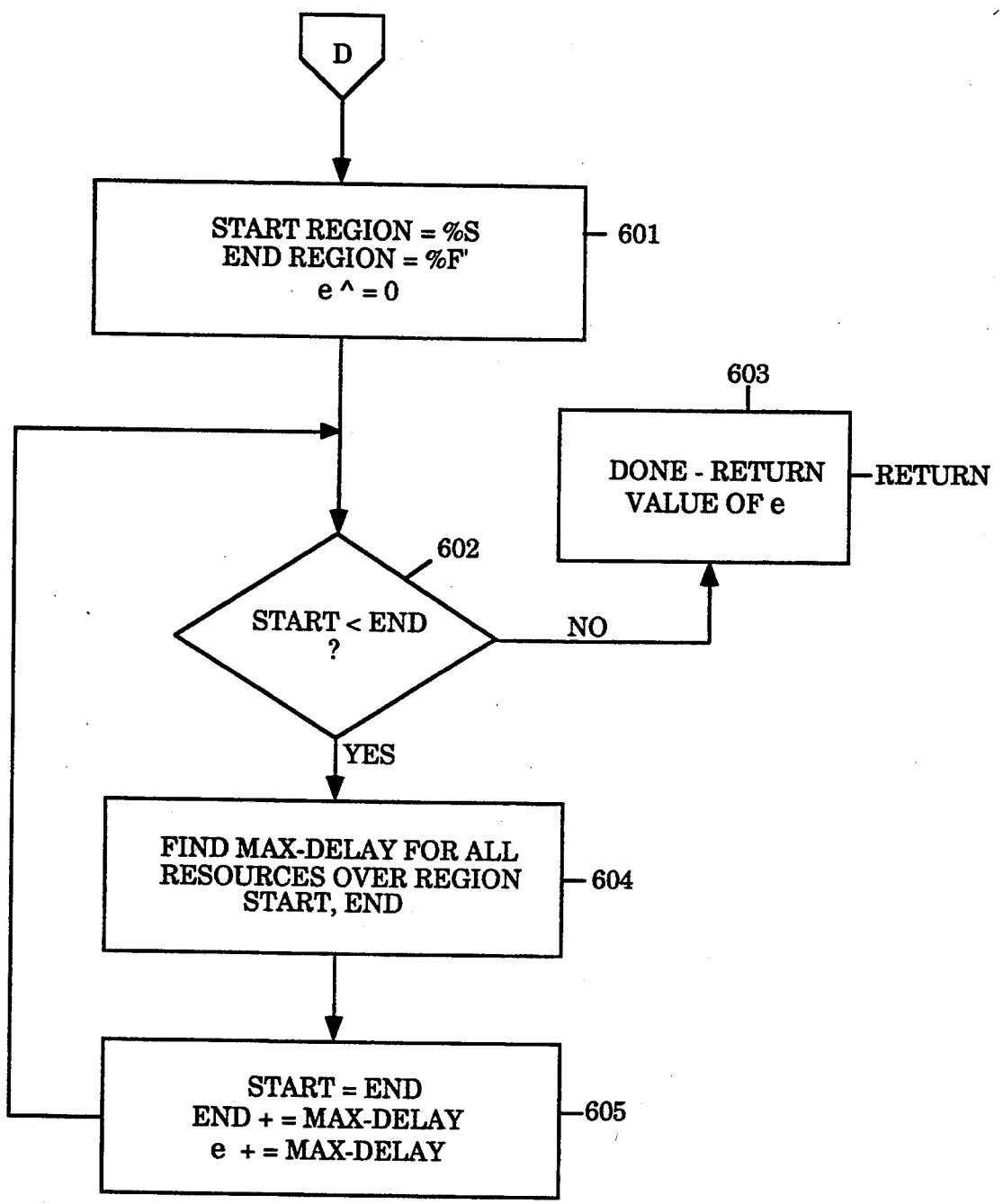
FIG. 9 is more detailed flowchart of a portion of the general flowchart for calculating the delay caused by a shortfall occurring during the duration of an activity.
Figure 10:
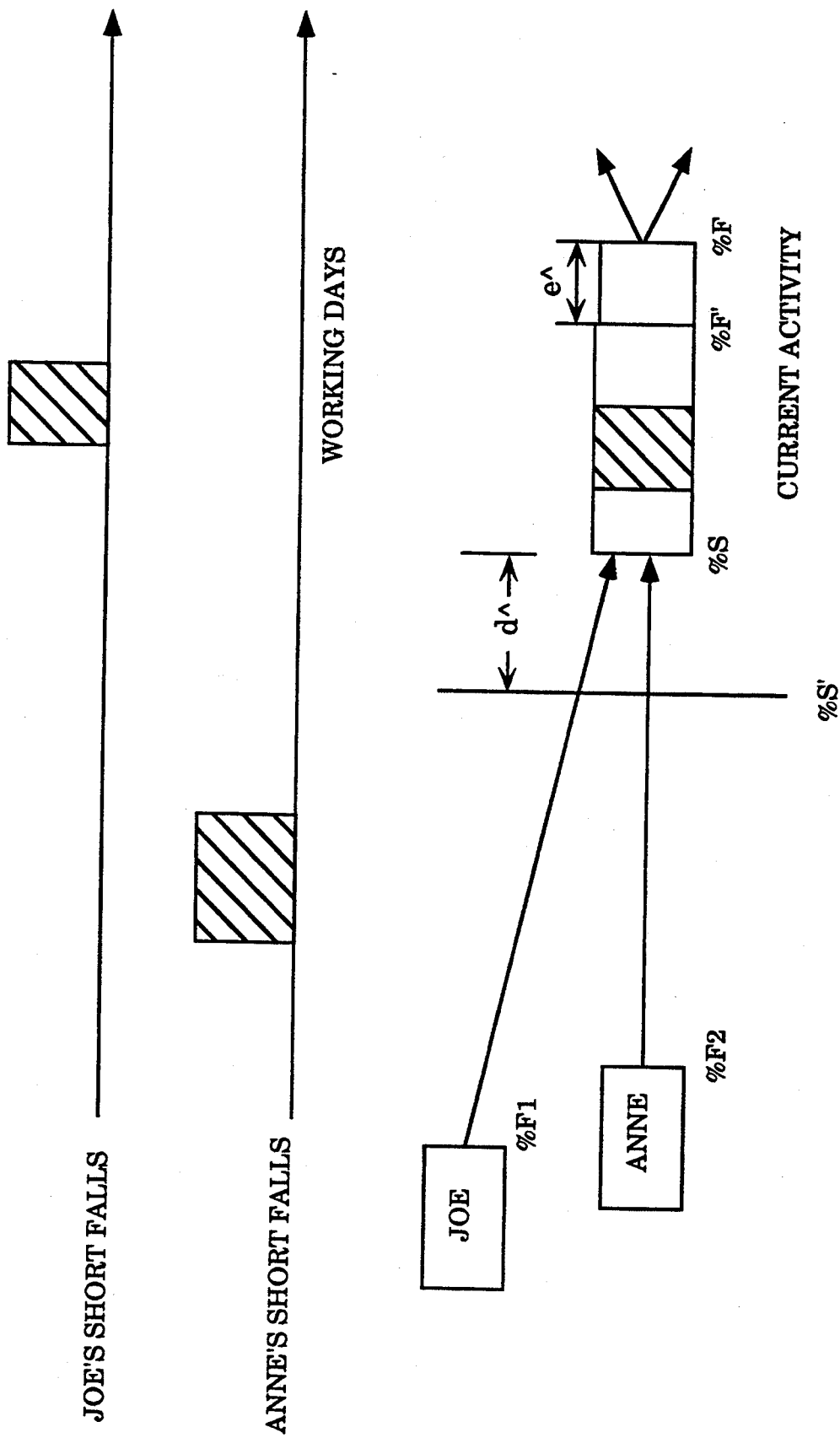
FIG. 10 illustrates that resource shortfalls are spanned by stretching start and finish times.
Figure 11:
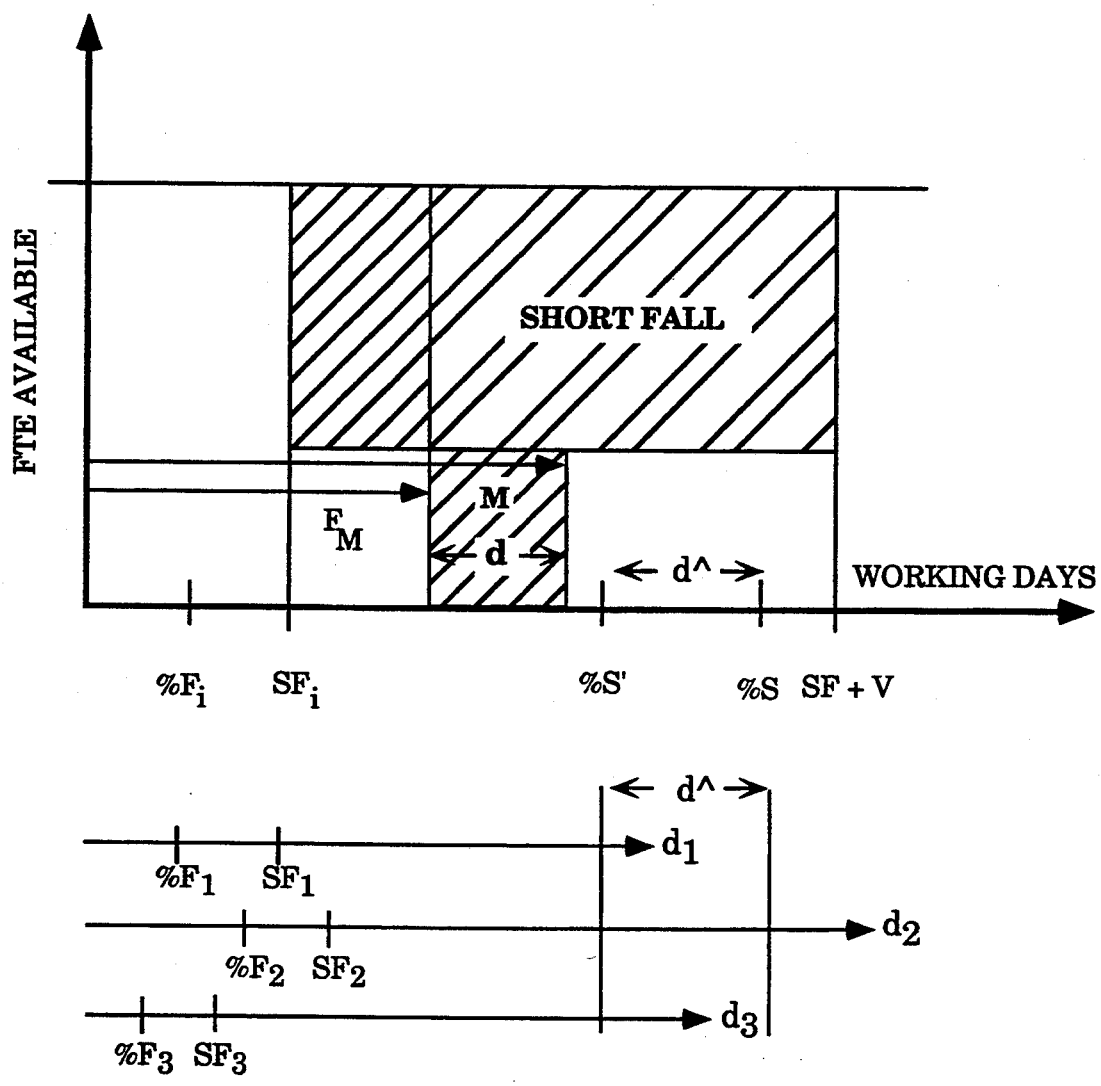
FIG. 11 graphically illustrates a shortfall delay.
Figure 12:
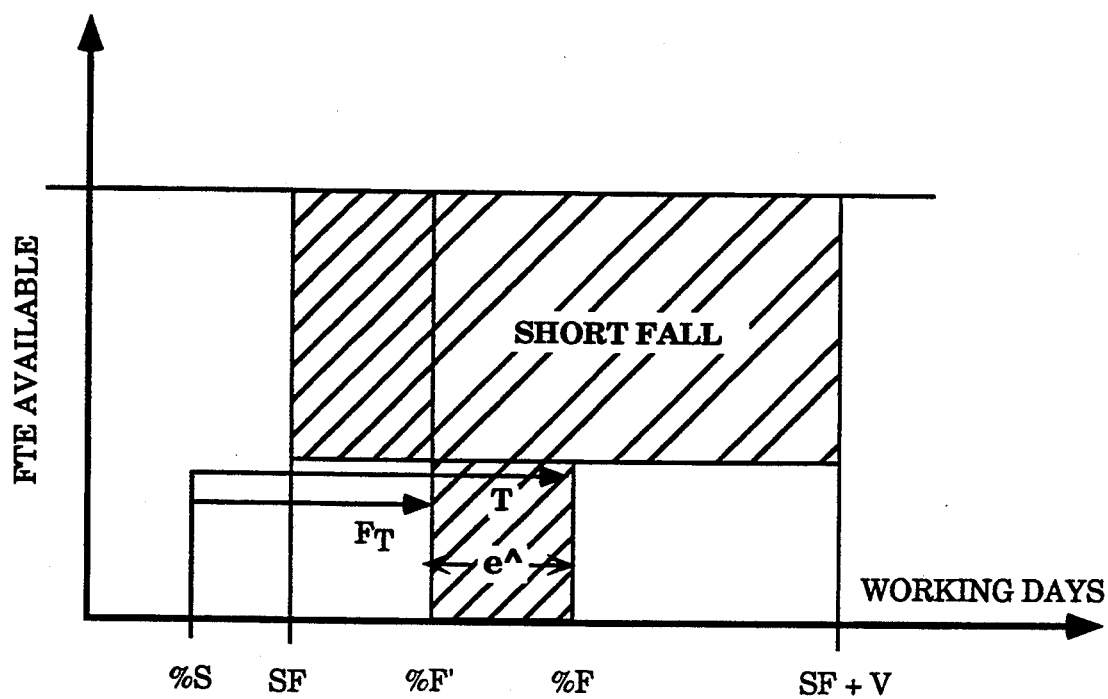
FIG. 12 graphically illustrates the computation of shortfall delay in the finish time of an activity.

The procedure of step 212 procedure is described in detail with reference to FIG. 9. At box 601 the region to be examined for shortfall is initialized to $\%S$, $\%F'$, and $e^\wedge$ is set to zero. The variable $e^\wedge$ is the delay which stretches the duration of the activity out to a point where the % total effort will fit within the FTE available. The variance of the activity duration is not changed. As long as the start of the region is less than the end, boxes 604 and 605 are repeated. These two steps are the same as those described for calculating delay for the start in boxes 508 through 510. In this procedure, the end point of the region is the time point M in equation 16.

If the activity uses more than one resource, each resources' shortfall calendar must be examined for shortfall in the region of interest and the delay calculated. The maximum of the calculated delays is then used to increment $e^\wedge$ at box 605. At this point the region is reset to account for any delay found at step 604. When no delay is found, the start of the region will be equal or greater than the end at decision box 602 and the value of $e^\wedge$ is returned at box 603.

Having accounted for all shortfalls occurring during the duration of the activity, the new distribution for the finish time is determined at step 213 of the primary iterative portion represented in FIG. 4. The expected duration through the current activity is defined:

$$T^\mu = ^FT^\mu + e^\wedge$$

The variance through the activity is not adjusted and remains as:

$$T^\nu = ^FT^\nu$$

Thus the scheduled finish time for the activity, preserving the % confidence factor and accounting for concurrent shortfalls is:

$$\%F + e^\wedge$$

Figure 5:
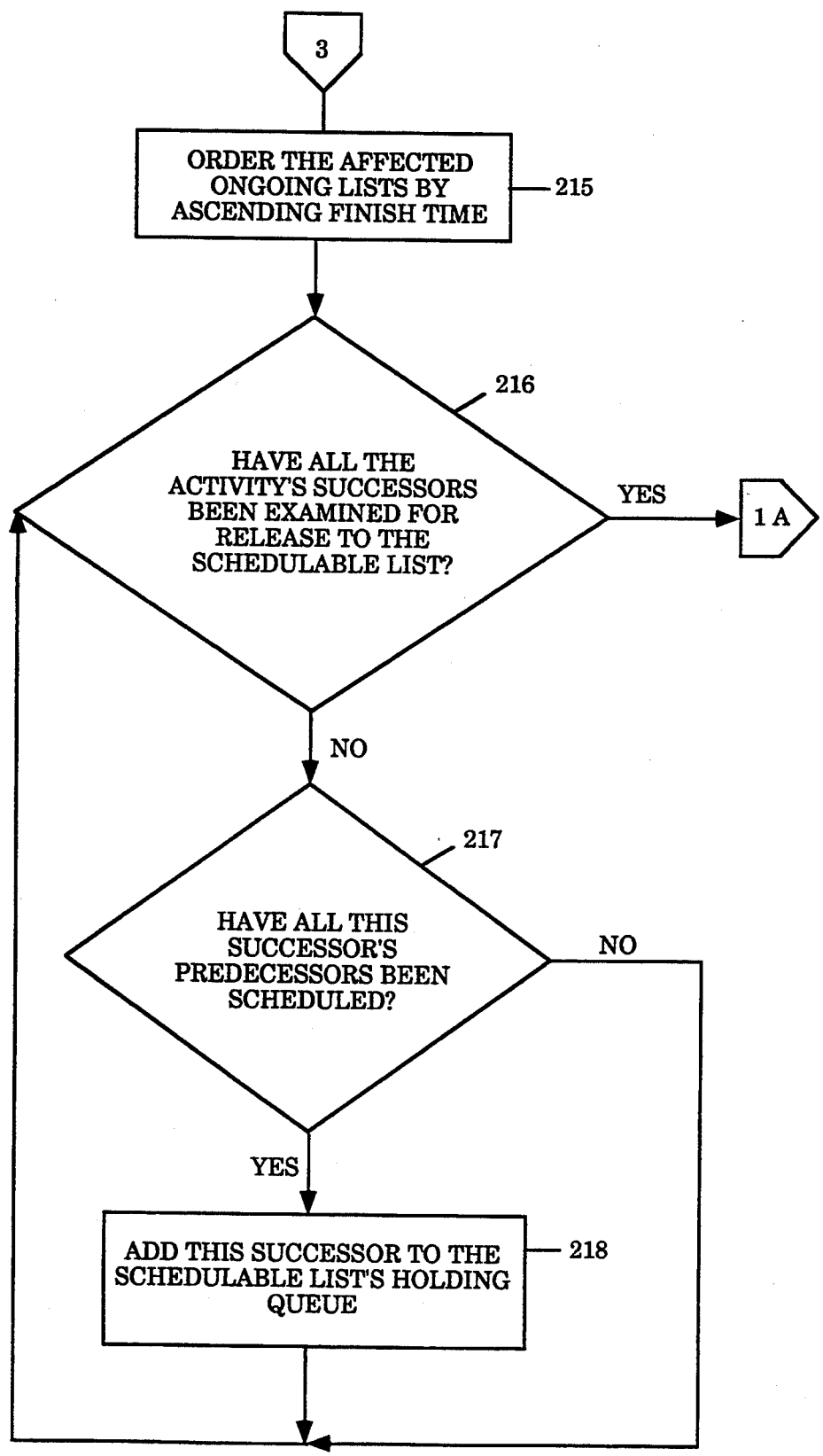
FIG. 5 is the final portion of the general flowchart of the scheduling system in accordance with the present invention.

Once the start and finish time for the activity have been determined preserving the confidence level and accounting for all shortfalls, the activity is added to the ongoing list of each of its resources and marked as scheduled at step 214. Then, at step 215 on FIG. 5, the affected ongoing lists are ordered by ascending finish times.

When an activity is scheduled, any successor activities which included a precedence arc from the activity scheduled may then be eligible to be scheduled. When all successor activities have been examined for release to the Schedulable list at step 216, the procedure returns to the top of procedure 200 at step 201 to continue the main iteration. While not all successor activities have been examined, it is necessary to check for each successor that all of its predecessors have been scheduled (step 217). If the activity's predecessors have all been scheduled, the successor activity is added to the Schedulable List's holding queue at step 218.

The main iterative portion repeats until all activities have been scheduled in such a manner that resources are constrained, the % confidence level is maintained and all shortfalls are accounted for.

Once all the activities have been scheduled, the project network is scheduled and available for review and utilization by the user for managing a project and allocating tasks and resources according to the scheduled project. As is obvious to one skilled in the art, the user may view a variety of information in a variety of formats. For example, the user may view a time line of resource usage relative to the activities in the project network or can view a calendar of scheduled activities.

It will be recognized by one skilled in the art that the above detailed description of the invention may be embodied in other specific forms without departing from the spirit of the invention. Thus, it is understood that the invention is not to be limited by the foregoing illustrative details, but rather is to be defined by the appended claims.

We claim:

1. In a computer system comprising a central processing unit, a display monitor comprising a matrix of pixels and a memory, said memory for storing a project network comprising a plurality of activities to be performed, said activities being scheduled in order of precedence, each activity requiring zero or more resources to perform the activity, a method for probabilistic resource constrained scheduling of activities in the project network comprising the steps of:

receiving electrical signals which define a list of activities, comprising estimated parameters of probability distributions on activity durations, the resources each activity will require, and a confidence factor;

storing said list of activities in said memory;

establishing a precedence arc between an activity and each predecessor activity which must be performed before the activity can be performed;

manipulating the data by means of electrical signals in said memory for creating a deterministic unconstrained schedule of activities in logical order comprising the precedence arcs identifying the predecessor activities, calculated slack times and unconstrained start and finish times for each activity comprising the steps of:

(1) assigning all activities with no predecessor activities to a Schedulable list and all other activities to an Unschedulable list;

(2) iteratively selecting from the Schedulable list each activity to be scheduled, taking into account resource constraints as necessary to provide an accurate schedule of activities in a project network, each iteration comprising the steps of;

selecting a current activity from the Schedulable list, said current activity being the activity having the least amount of slack time, determining if the resources required by the current activity are available, and therefore the current activity is resource constrainable, if the resource is not available, adding a resource arc from the current activity to the scheduled activity which must complete utilization of the resource before the resource is available for the current activity to use; and scheduling the current activity and moving the activity to a Scheduled list;

repeating steps (1) and (2) until all activities are scheduled;

calculating the start time of each activity preserving the confidence factor of the project network based upon means, variances, and correlation coefficients of cumulative duration through all incoming activities as identified by the resource and precedence arcs;

calculating the end time of each activity based on the supplied parameters of a probability distribution on activity durations and the confidence factor; and generating an electrical signal to actuate the pixels on said display monitor for displaying said schedule of activities, whereby the uncertainty of activity durations is taken into account and the schedule is resource feasible within the prescribed confidence level.

2. The method of claim 1 wherein the steps of calculating the start and finish time of an activity Can be determined by calculating the activity's mean cumulative duration and variance, comprising the steps of:

ordering all inbound activities to the activity by descending values of their cumulative mean durations;

estimating an initial value for the maximum mean and variance which will be the cumulative mean and variance of the first inbound activity;

iterating over all inbound activities to the activity;

during each iteration, calculating the correlation between inbound cumulative durations and the estimate of the maximum mean duration and variance, and re-estimating the maximum mean duration and variance; and setting the maximum mean duration and variance equal to the last estimate.

3. The method as set forth in claim 1, wherein the step of determining if the resources required by the current activity are available comprises the steps of:

identifying the full time equivalent of effort (FTE) each resource can supply;

identifying the FTE required (FTE_Required) by the current activity;

initializing the FTE remaining (FTE_Remaining) for each resource to be the FTE of the resource;

if the FTE Remaining is greater than or equal to the FTE_Required by the current activity;

determining that the resource is available; and adjusting the value of the FTE_Remaining by subtracting the FTE_Required from the FTE_Remaining;

if the FTE_Remaining is less than the FTE_Required by the current activity;

adding the FTE Required for scheduled activities to the FTE_Remaining until the FTE_Remaining is greater than or equal to the current activity's FTE_Required; and adding a resource arc from all scheduled activities who's FTE_Required was last added to FTE_Remaining;

whereby resource arcs are selectively added to produce a resource feasible schedule.

4. The method as set forth in claim 1, wherein the Scheduled list comprises a Scheduled and Ongoing list and a Scheduled and Done list, said method further comprising the steps of:

identifying the full time equivalent of effort (FTE) each resource can supply;

initializing the FTE_Remaining of each resource to be the FTE of the resource;

identifying the FTE required (FTE_Required) by the current activity;

scheduling the current activity by moving the current activity to the Scheduled and Ongoing list;

if the FTE_Remaining is greater than or equal to the FTE_Required by the current activity, determining that the resource is available, and adjusting the value of FTE_Remaining by subtracting the FTE_Required from the FTE_Remaining;

if the FTE_Remaining is less than the FTE_Required by the current activity, adding a resource arc directed to the selected activity from a scheduled activity Comprising the steps of;

(a) moving an activity from the Scheduled and Ongoing list to the Scheduled and Done list, (b) adding the FTE equivalent required by the activity to the FTE_Remaining for the resource, (c) determining if the FTE_Remaining is greater than or equal to FTE_Required of the current activity, repeating steps (a), (b), (c) until the FTE_Remaining is greater than or equal to FTE_Required by the scheduled activity, and adding the resource arc from the last activity moved to the Scheduled and Done List to the current activity.

5. The method of claim 1 further comprising the steps of:

releasing to a holding queue previously unschedulable activities which have become schedulable because the current activity has been scheduled;

moving activities in the holding queue which are resource constrainable to the Schedulable list;

retaining in the holding queue activities which are schedulable but not resource constrainable;

when the activities in the Schedulable list are scheduled and the Schedulable list is empty, moving the activities in the holding queue to the Schedulable list to be scheduled;

whereby the resources are efficiently utilized and the schedule is feasible within the prescribed confidence level.

6. The method of claim 1 further comprising the step of adjusting the start time for a current activity to accommodate delays caused by all resource shortfalls which occur prior to the start time of the selected activity, comprising the steps of:

calculating the criticality index for each inbound activity as the probability that the inbound activity will be the inbound activity having the longest duration;

for each inbound activity for which the criticality index is not zero, iteratively evaluating the maximum delay caused by each inbound activity incurring a shortfall between the finish time of the inbound activity and the initial scheduled start time for the current activity; and increasing the start time of the current activity by the product of the amount of delay to be caused by each inbound activity multiplied by the inbound activity's criticality index.

7. The method of claim 1 further comprising the step of determining a delay of the finish time of the current activity due to shortfalls prior to the finish time of the activity, comprising the iterative steps of:

initially setting the end delay to be equal to zero;

defining start and end regions to initially correspond to the start and finish time for the current activity;

(a) evaluating the end delay as the delay which can occur due to shortfalls occurring between the start and end regions, (b) setting the start region to be equal to the end region, (c) increasing the end region by an amount of the maximum delay for each shortfall, repeating steps (a), (b), (c) until the start and end regions are equal;

whereby the end region represents the finish time increased by the delays due to shortfalls.

8. The method of claim 7 wherein the step of determining the maximum delays for a defined region comprise the steps of:

initially setting the end delay to zero;

retrieving a list of the shortfalls over the defined region;

for each shortfall occurring entirely within the defined region, increasing the delay by the duration of the shortfall; and for each shortfall occurring only partially in the defined region, increasing the delay by the duration of that portion of the shortfall occurring within the defined region.

9. A computer system for resource constrained scheduling of activities in a project network, said computer system comprising a central processing unit, a display monitor comprising a matrix of pixels and a memory, said activities being scheduled in order of precedence, each activity requiring zero or more resources to perform the activity, said computer system comprising:

input means for receiving a list of defined activities, the resources required by each activity and any predecessor activities which must be performed before the activity can be performed, said list of defined activities and said resources being stored in said memory for manipulation by electrical signals under the control at said central processing unit;

means for defining an Unschedulable list in said memory comprising those activities having predecessor activities not yet scheduled;

means for defining a Schedulable list in said memory comprising those activities with scheduled predecessor activities;

means for defining a Scheduled list in said memory for those activities which are scheduled:

means for iteratively scheduling activities comprising;
  means for manipulating activities in said memory among the unschedulable, schedulable and scheduled lists, whereby
    a current activity is moved from the Unschedulable to the Schedulable list when the current activity has no predecessor activities or the current activity has predecessor activities which have been scheduled;
    the current activity is moved from the Schedulable list to the Scheduled list in an order according to a selection mechanism, said current activity is moved once it is determined that the resources required by the current activity are available and the current activity is resource constrained;
    if the resources required by the current activity are not available, means for adding a resource arc from the current activity to the scheduled activity which must complete utilization of the resource before the resource is available for the selected activity to use;
  calculating means for determining the start time of each activity scheduled preserving the confidence factor of the project network and based upon the incoming activities as identified by the resource and precedence arcs;
  means for calculating the finish time of each activity based on the parameters of a probability distribution on activity durations; and
  means for generating an electrical signal to actuate the pixels on said display monitor for displaying the schedule of activities,
  whereby the uncertainty of activity durations is taken into account and the schedule is resource constrained and feasible.

10. The computer system as set forth in claim 9 further comprising means for increasing the start time to accommodate delays caused by all resource shortfalls which occur prior to the start time of the current activity comprising:
  means for calculating the criticality index for each inbound activity according to the probability that each inbound activity will be the longest inbound activity;
  means for evaluating, for each inbound activity for which the criticality index is not zero, the maximum delay caused by the inbound activity incurring a shortfall between its scheduled finish time and the estimated start time of the current activity, and increasing the estimated start time of the current activity by the product of the amount of delay multiplied by the criticality index.

11. The computer system as set forth in claim 9, further comprising means for determining a delay of the finish time of the current activity due to shortfalls which occur prior to the finish time of the selected activity comprising:
  means for defining an end delay initially set to zero;
  means for defining start and end regions to initially correspond to the scheduled start and estimated finish times for the current activity;
  means for calculating the end delay as the maximum delay which can occur due to shortfalls appearing between the start and end regions;
  means for resetting the start region to be equal to the end region; and
  means for increasing the end region by an amount of the end delay for each shortfall;
  wherein the evaluating means for setting and means for increasing are executed until the start and end regions are equal;
  whereby the end region represents the finish time increased by delays due to shortfalls.

12. The apparatus as set forth in claim 9, wherein said Scheduled list comprises a Scheduled and Ongoing list and Scheduled and Done list, said current activity is moved from the Schedulable list to the Scheduled and Ongoing list;
  each resource has a full time equivalent of effort (FTE) that it can supply;
  each activity has a FTE requirement (FTE_Required) for at least one resource;
  said means for adding a resource arc comprising:
    means for providing a variable FTE_Remaining for each resource which identifies the amount of FTE_Remaining for a resource, FTE_Remaining being initialized to the FTE of the resource;
    comparison means for comparing the FTE_Remaining to the FTE_Required for the current activity;
    said means for adding a resource arc moves activities from the Scheduled and Ongoing list to the Scheduled and Done list and adds the FTE equivalent required by the scheduled activity moved to the Scheduled and Done list to the FTE_Remaining, until the FTE_Remaining is greater than or equal to the FTE_Required, and adds a resource arc from the last activity moved to the Scheduled and Done list to the current activity when the FTE_Remaining is less than the FTE_Required by the current activity.

13. In a computer system comprising a central processing unit (CPU), an input/output (I/O) means coupled to said CPU for providing a communication interface, a memory means coupled to said I/O means for storing instructions and computer dam, data input means coupled to said I/O means for providing data input and data output to interface with a computer user, and a display device coupled to said I/O means, said display device comprising a matrix of pixels for displaying results, said computer system determining an optimal project network for allocating a number of resources among a number of activities, said memory for storing data representations of the activities and data representations of the resources, said activities being scheduled in order of precedence, a method for probabilistic resource constrained scheduling of activities comprising the steps of:
  receiving electrical signals through said data input means which define the data representation of said activities and said resources, wherein the data representation of each of said activities includes estimated parameters of probability distributions on each of said activities durations, the resources required, and confidence factors;
  storing said data representations of said activities and said resources in said memory;
  examining the data representation of each activity and establishing data in said memory corresponding to a precedence are between the data representation of an activity and the data representation of each activity which must be performed before the activity Can be performed;

manipulating the data in said memory by means of electrical signals provided to said memory for creating a deterministic unconstrained schedule of activities in logical order comprising the precedence arcs data identifying predecessor activities, calculated slack times and unconstrained start and finish times for each activity Comprising the steps of:

(1) assigning the data representation of all activities with no predecessor activities to a Schedulable list in said memory and the data representation of all other activities to an Unschedulable list in said memory;

(2) iteratively selecting from the Schedulable list in said memory the data representation of each activity to be scheduled, taking into account resource constraints as necessary to provide an accurate schedule of activities in the project network, each iteration comprising the steps of:

selecting a data representation of a current activity from the Schedulable list in said memory, said current activity being the activity having the least amount of slack time, determining, from said data representation stored in said memory, if the resources required by the current activity are available, and therefore the current activity is resource constrainable, if a resource is not available, establishing data in said memory corresponding to a resource arc from the current activity to the scheduled activity which must complete utilization of the resource before the resource is available for the current activity to use; and scheduling the current activity and moving the data representation of the activity to a Scheduled list in said memory;

repeating steps (1) and (2) until all activities are scheduled;

calculating, from said data representation stored in said memory, the start time of each activity, preserving the confidence factor of the project network based upon means, variances, and correlation coefficients of cumulative duration through all incoming activities as identified by the resource and precedence arcs data;

calculating, from said data representation stored in said memory, the end time of each activity based on the supplied parameters of a probability distribution on activity durations and the confidence factor; and generating an electrical signal to actuate the pixels on said display device for displaying said schedule of activities, whereby the uncertainty of activity durations is taken into account and the schedule is resource feasible within the prescribed confidence level.

14. The method of claim 13 wherein the steps of calculating the start and finish time of an activity Can be determined by calculating, from said data representation stored in said memory, the activity's mean cumulative duration and variance, comprising the steps of:

ordering all inbound activities to the activity by descending values of their cumulative mean durations;

estimating, based on said data representation stored in said memory, an initial value for the maximum mean and variance which will be the cumulative mean and variance of the first inbound activity;

iterating over all inbound activities to the activity;

during each iteration, calculating from said data representation stored in said memory the correlation between inbound cumulative durations and the estimate of the maximum mean duration and variance, and re-estimating based on said data representation stored in said memory the maximum mean duration and variance; and setting the maximum mean duration and variance equal to the last estimate.

15. The method as set forth in claim 13, wherein the step of determining if the resources required by the current activity are available comprises the steps of:

identifying, from said data representation stored in said memory, the full time equivalent of effort (FTE) each resource can supply;

identifying, from said dam representation stored in said memory, the FTE required (FTE_Required) by the current activity;

initializing the FTE remaining (FTE_Remaining) for each resource to be the FTE of the resource;

if the FIE_Remaining is greater than or equal to the FTE_Required by the current activity, determining that the resource is available, and adjusting the value of the FTE_Remaining by subtracting the FTE_Required from the FTE_Remaining;

if the FTE_Remaining is less than the FTE_Required by the current activity, adding the FTE_Required for scheduled activities to the FTE_Remaining until the FIE_Remaining is greater than or equal to the current activity's FTE_Required, and establishing data in said memory corresponding to a resource arc from the current activity to all scheduled activities whose FIE_Required was last added to FTE_Remaining, whereby data corresponding to resource arcs are selectively established to produce a resource feasible schedule.

16. The method as set forth in claim 13, wherein the Scheduled list in said memory comprises a Scheduled and Ongoing list in said memory and a Scheduled and Done list in said memory, said method further comprising the steps of:

identifying, from said data representation stored in said memory, the full time equivalent of effort (FTE) each resource can supply;

initializing the FTE_Remaining of each resource to be the FTE of the resource;

identifying, from said data representation stored in said memory, the FTE required (FTE_Required) by the current activity;

scheduling the current activity by moving the current activity to the Scheduled and Ongoing list in said memory;

if the FTE_Remaining is greater than or equal to the FTE_Required by the current activity, determining that the resource is available, and adjusting the value of FTE_Remaining by subtracting the FTE_Required from the FTE_Remaining;

if the FTE_Remaining is less than the FTE_Required by the current activity, establishing data in said memory corresponding to a resource are directed to the selected activity from a scheduled activity Comprising the steps of:

(a) moving the data representation of an activity from the Scheduled and Ongoing list in said memory to the Scheduled and Done list in said memory, (b) adding the FTE equivalent required by the activity to the FTE_Remaining for the resource, (c) determining if the FTE_Remaining is greater than or equal to FTE_Required of the current activity, repeating steps (a), (b), (c) until the FTE_Remaining is greater than or equal to FTE_Required by the scheduled activity, and establishing data in said memory corresponding to the resource are from the last activity moved to the Scheduled and Done List in said memory to the current activity.

17. The method of claim 13 further comprising the steps of:

releasing to a holding queue previously unschedulable activities which have become schedulable because the current activity has been scheduled;

moving the data representation of activities in the holding queue which are resource constrainable to the Schedulable list in said memory;

retaining in the holding queue the data representation of activities which are schedulable but not resource constrainable;

when the activities in the Schedulable list in said memory are scheduled and the Schedulable list in said memory is empty, moving the data representation of the activities in the holding queue to the Schedulable list in said memory to be scheduled;

whereby the resources are efficiently utilized and the schedule is feasible within the prescribed confidence level.

18. The method of claim 13 further comprising the step of adjusting the start time for a current activity to accommodate delays caused by all resource shortfalls which occur prior to the start time of the selected activity, comprising the steps of:

calculating, from said data representation stored in said memory, the criticality index for each inbound activity as the probability that the inbound activity will be the inbound activity having the longest duration;

for each inbound activity for which the criticality index is not zero, iteratively evaluating based on the data representation in said memory the maximum delay caused by each inbound activity incurring a shortfall between the finish time of the inbound activity and the initial scheduled start time for the current activity; and increasing the start time of the current activity by the product of the mount of delay to be caused by each inbound activity multiplied by the inbound activity's criticality index.

19. The method of claim 13 further comprising the step of determining a delay of the finish time of the current activity due to shortfalls prior to the finish time of the activity, comprising the iterative steps of:

initially setting the end delay to be equal to zero;

defining start and end regions to initially correspond to the start and finish time for the current activity;

(a) evaluating, based on the data representation in said memory, the end delay as the delay which can occur due to shortfalls occurring between the start and end regions, (b) setting the start region to be equal to the end region, (c) increasing the end region by an amount of the maximum delay for each shortfall, repeating steps (a), (b), (c) until the start and end regions are equal;

whereby the end region represents the finish time increased by the delays due to shortfalls.

20. The method of claim 19 wherein the step of determining the maximum delays for a deemed region comprise the steps of:

initially setting the end delay to zero;

retrieving a set of data representations of the shortfalls over the defined region;

for each shortfall occurring entirely within the defined region, increasing the delay by the duration of the shortfall; and for each shortfall occurring only partially in the deemed region, increasing the delay by the duration of that portion of the shortfall occurring within the defined region.

21. A computer system for resource constrained scheduling of activities in a project network, said computer system comprising a central processing unit (CPU), an input/output (I/O) means coupled to said CPU for providing a communication interface, a memory means couple to said I/O means for storing instructions and computer data, an data input means coupled to said I/O means for providing data input and data output to interface with a computer user, and a display device coupled to said I/O means, said display device comprising a matrix of pixels which can be selectively activated by providing electrical signals, said activities being scheduled in order of precedence, each activity requiring zero or more resources to perform the activity, said computer system comprising:

data input means for receiving data representations of the activities and the data representations of the resources required by each activity and any predecessor activities which must be performed before the activity Can be performed, said data representations being stored in said memory for manipulation by electrical signals under the control of said CPU;

means for defining an Unschedulable list in said memory comprising those activities having predecessor activities not yet scheduled;

means for defining a Schedulable list in said memory comprising those activities with scheduled predecessor activities;

means for defining a Scheduled list in said memory for those activities which are scheduled;

means for iteratively scheduling activities comprising:

means for manipulating the data representations stored in said memory among the unschedulable, schedulable and scheduled lists, wherein data representation of a current activity is moved from the Unschedulable list to the Schedulable list when the current activity has no predecessor activities or the current activity has predecessor activities which have been scheduled;

the data representation of the current activity is moved from the Schedulable list to the Scheduled list in an order according to a selection mechanism, said data representation of the current activity is moved once it is determined that the resources required by the current activity are available and the current activity is resource constrained;

if the resources required by the current activity are not available, means for establishing in said memory a data representation of a resource arc from the current activity to the scheduled activity which must complete utilization of the resource before the resource is available for the selected activity to use;

means for calculating, from said data representation stored in said memory, the start time of each activity scheduled, preserving the confidence factor of the project network and based upon the incoming activities as identified by the resource and precedence arcs;

means for calculating, from said data representation stored in said memory, the finish time of each activity based on the parameters of a probability distribution on activity durations; and means for generating an electrical signal to activate the pixels on said display device for displaying the schedule of activities, whereby the uncertainty of activity durations is taken into account and the schedule is resource constrained and feasible.

22. The computer system as set forth in claim 21 further comprising means for increasing the start time to accommodate delays caused by all resource shortfalls which occur prior to the start time of the current activity comprising:

means for calculating, from said data representation stored in said memory, the criticality index for each inbound activity according to the probability that each inbound activity will be the longest inbound activity;

means for evaluating, for each inbound activity for which the criticality index is not zero based on said data representation stored in said memory the maximum delay caused by the inbound activity incurring a shortfall between its scheduled finish time and the estimated start time of the current activity, and increasing the estimated start time of the current activity by the product of the amount of delay multiplied by the criticality index.

23. The computer system as set forth in claim 21, further comprising means for determining, from said data representation stored in said memory, a delay of the finish time of the current activity due to shortfalls which occur prior to the finish time of the selected activity comprising:

means for defining an end delay initially set to zero;

means for defining start and end regions to initially correspond to the scheduled start and estimated finish times for the current activity;

means for calculating, from said data representation stored in said memory, the end delay as the maximum delay which can occur due to shortfalls appearing between the start and end regions;

means for resetting the start region to be equal to the end region; and means for increasing the end region by an mount of the end delay for each shortfall;

wherein the evaluating means for setting and means for increasing are executed until the start and end regions are equal;

whereby the end region represents the finish time increased by delays due to shortfalls.

24. The apparatus as set forth in claim 21, wherein said Scheduled list comprises a Scheduled and Ongoing list and Scheduled and Done list, the data representation of the current activity is moved from the Schedulable list to the Scheduled and Ongoing list;

each resource has a full time equivalent of effort (FTE) that it can supply;

each activity has a FTE requirement (FTE_Required) for at least one resource, said means for establishing data in said memory corresponding to a resource are comprising:

means for providing a variable FTE_Remaining for each resource which identifies the amount of FTE_Remaining for a resource, FTE_Remaining being initialized to the FTE of the resource;

comparison means for comparing the FTE_Remaining to the FTE_Required for the current activity;

said means for establishing data in said memory corresponding to a resource are moves activities from the Scheduled and Ongoing list to the Scheduled and Done list and adds the FTE equivalent required by the scheduled activity moved to the Scheduled and Done list to the FTE_Remaining, until the FTE_Remaining is greater than or equal to the FTE_Required, and establishes data in said memory corresponding to a resource arc from the last activity moved to the Scheduled and Done list to the current activity when the FTE_Remaining is less than the FTE_Required by the current activity.

* * * * *

UNITED STATES PATENT AND TRADEMARK OFFICE
CERTIFICATE OF CORRECTION

PATENT NO. : 5,406,476

DATED : April 11, 1995

INVENTOR(S) : Denziel, Jr. et al.

It is certified that error appears in the above-identified patent and that said Letters Patent is hereby corrected as shown below:

In column 20, claim 2 at line 35, column 24, claim 13 at line 68 , column 25, claim 14 at line 60, and column 28, claim 21 at line 43, please delete " Can " and insert -- can --.

In column 21, claim 4 at line 32 and column 27, claim 16 at line 1, please delete " Comprising " and insert -- comprising --.

In column 24, claim 13 at line 41 and column 26, claim 15 at line 19, please delete " dam " and insert -- data --.

In column 27, claim 16 at line 17 and column 30, claim 24 at lines 30 and 39, please delete " are " and insert -- arc --.

UNITED STATES PATENT AND TRADEMARK OFFICE
CERTIFICATE OF CORRECTION

PATENT NO. : 5,406,476
DATED : April 11, 1995
INVENTOR(S) : Denziel, Jr. et al.

It is certified that error appears in the above-identified patent and that said Letters Patent is hereby corrected as shown below:

In column 27, claim 18 at line 57, please delete " mount " and insert -- amount --.

In column 28, claim 20 at line 21, please delete " deemed " and insert -- defined --.

Signed and Sealed this

Sixth Day of April, 1999

*Attest:*

Q. TODD DICKINSON

*Attesting Officer*  Acting Commissioner of Patents and Trademarks